(12) United States Patent
Witzel

(10) Patent No.: US 10,904,802 B2
(45) Date of Patent: Jan. 26, 2021

(54) SERVICE DELIVERY TO HANDED OVER USER EQUIPMENT (UE) USING A SOFTWARE-DEFINED NETWORKING (SDN) CONTROLLER

(71) Applicant: Telefonaktiebolaget LM Ericsson (publ), Stockholm (SE)

(72) Inventor: Andreas Witzel, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 123 days.

(21) Appl. No.: 16/086,570

(22) PCT Filed: Mar. 29, 2016

(86) PCT No.: PCT/IB2016/051754
§ 371 (c)(1),
(2) Date: Sep. 19, 2018

(87) PCT Pub. No.: WO2017/168205
PCT Pub. Date: Oct. 5, 2017

(65) Prior Publication Data
US 2019/0104442 A1 Apr. 4, 2019

(51) Int. Cl.
*H04W 36/00* (2009.01)
*H04W 36/08* (2009.01)
(Continued)

(52) U.S. Cl.
CPC ..... *H04W 36/0011* (2013.01); *G06F 9/45558* (2013.01); *H04L 41/0896* (2013.01);
(Continued)

(58) Field of Classification Search
CPC ............ H04L 41/0806; H04L 41/0896; H04L 41/5025; H04L 67/2842; H04L 12/24;
(Continued)

(56) References Cited

U.S. PATENT DOCUMENTS 9,781,016 B1 * 10/2017 Marquardt et al.
9,794,352 B2 * 10/2017 Qiang
(Continued)

FOREIGN PATENT DOCUMENTS

| EP | 2770800 A1 | 8/2014 |
|---|---|---|
| EP | 3007391 A1 | 4/2016 |

(Continued)

OTHER PUBLICATIONS

3GPP TSG-RAN WG3 Meeting #93bis, "Ericsson: Some Observations on NFV," R3-162426, 3GPP Draft, 3rd Generation Partnership Project, Oct. 10-14, 2016, vol. RAN WG3, Retrieved from http://www.3gpp.org/ftp/Meetings_3G99_SYNC/RAN3/Docs/ on Oct. 6, 2016, 5 pages.

(Continued)

*Primary Examiner* — Marsha D Banks Harold
*Assistant Examiner* — Dharmesh J Patel
(74) *Attorney, Agent, or Firm* — Nicholson De Vos Webster & Elliott LLP

(57) ABSTRACT

In one embodiment, a method implemented in a virtual network function (VNF) manager for delivering of services to a roaming UE is disclosed. The method includes identifying a trigger condition for handing-over delivery of at least a subset of services from a radio interface of a source radio base station to a radio interface of a target radio base station. The method also includes transferring the subset of the services to the target radio base station through a route based on information from a software-defined networking (SDN) controller of a SDN system that includes the source radio base station and the target radio base station. The method further includes causing at least one VNF to be deployed on the target radio base station, the at least one VNF on the target radio base station being adapted to offer the subset of the services to the roaming UE.

17 Claims, 15 Drawing Sheets

(51) Int. Cl.
| | |
|---|---|
| *H04W 36/30* | (2009.01) |
| *H04W 24/02* | (2009.01) |
| *H04L 12/24* | (2006.01) |
| *H04L 29/08* | (2006.01) |
| *G06F 9/455* | (2018.01) |
| *H04W 8/08* | (2009.01) |

(52) U.S. Cl.
CPC ...... *H04L 41/5025* (2013.01); *H04L 67/2842* (2013.01); *H04W 8/08* (2013.01); *H04W 24/02* (2013.01); *H04W 36/0072* (2013.01); *H04W 36/08* (2013.01); *H04W 36/30* (2013.01); *G06F 2009/45595* (2013.01); *H04L 41/5087* (2013.01); *H04L 67/34* (2013.01)

(58) Field of Classification Search
CPC . H04L 12/4641; H04L 29/08; H04L 41/5087; H04L 67/34; H04W 8/08; H04W 24/02; H04W 36/08; H04W 36/0011; H04W 36/14; H04W 36/22; H04W 36/26; H04W 36/30; H04W 36/0072; H04W 48/18; H04W 8/186; H04W 36/00; H04W 41/5087; G06F 9/4558; G06F 2009/45595
See application file for complete search history.

(56) References Cited

U.S. PATENT DOCUMENTS

| | | | |
|---|---|---|---|
| 9,930,587 | B2* | 3/2018 | Vrzic et al. |
| 2013/0109378 | A1* | 5/2013 | Raleigh |
| 2014/0293885 | A1* | 10/2014 | Agrawal et al. |
| 2015/0055623 | A1* | 2/2015 | Li ............... H04W 40/04 370/331 |
| 2015/0180730 | A1 | 6/2015 | Felstaine et al. |
| 2015/0288541 | A1 | 10/2015 | Fargano et al. |
| 2017/0086111 | A1 | 3/2017 | Vrzic et al. |
| 2017/0086118 | A1 | 3/2017 | Vrzic |
| 2017/0164253 | A1 | 6/2017 | Fujinami |

FOREIGN PATENT DOCUMENTS

| | | |
|---|---|---|
| WO | 2014192259 A1 | 12/2014 |
| WO | 2015082013 A1 | 6/2015 |
| WO | 2015106822 A1 | 7/2015 |
| WO | 2017054841 A1 | 4/2017 |
| WO | 2017168205 A1 | 10/2017 |

OTHER PUBLICATIONS

ETSI, "Network function Virtualization (NFV), Management and Orchestration," ETSI GS NFV-MAN 001 V1.1.1 (Dec. 2014), Dec. 2014, retrieved from URL: https://www.etsi.org/deliver/etsi_gs/NFV-MAN/001_099/001/01.01.01_60/gs_nfv-man001v010101p.pdf on Jun. 7, 2016, pp. 1-184.
ETSI GS NFV 002 V1.21 (Dec. 2014), "Network Functions Virtualisation (NFV), Architectural Framework," Dec. 2014, pp. 1-21.
ETSI GS NFV-EVE 004 V1.1.1 (Mar. 2016), "Network Functions Virtualisation (NFV), Report on the Application of Different Virtualisation Technologies in the NFV Framework," Mar. 2016, pp. 1-23.
Network Functions Virtualisation (NFV) Architectural Framework, ETSI GS NFV 002 V1.1.1, (Oct. 2013), pp. 1-21.
NGMN Alliance, NGMN 5G White Paper, V1.0, 3rd generation Partnership project, Mobile Competence Centre, Feb. 17, 2015, 125 pages.

* cited by examiner

VNF Manager, VNF building

VNF Manager, partial handing-over

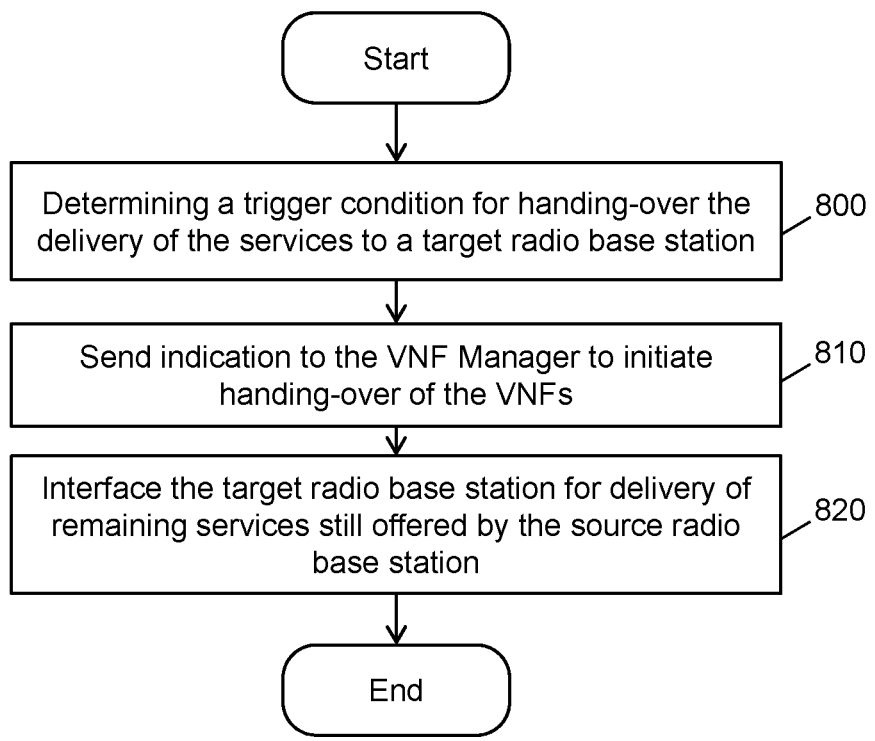
Figure 8          Source Radio Base Station
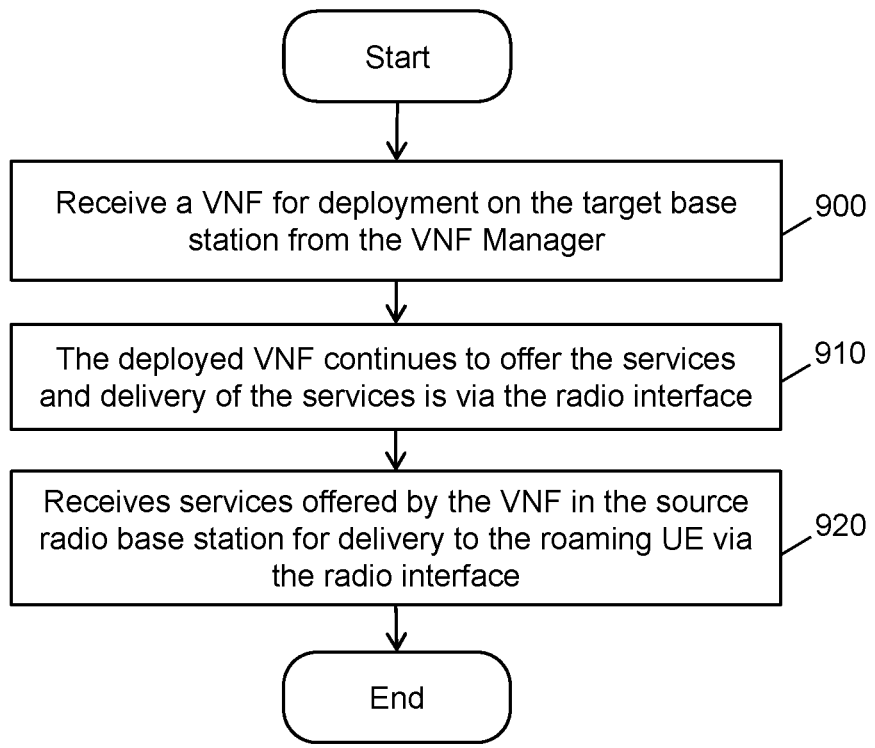
Figure 9          Target Radio Base Station

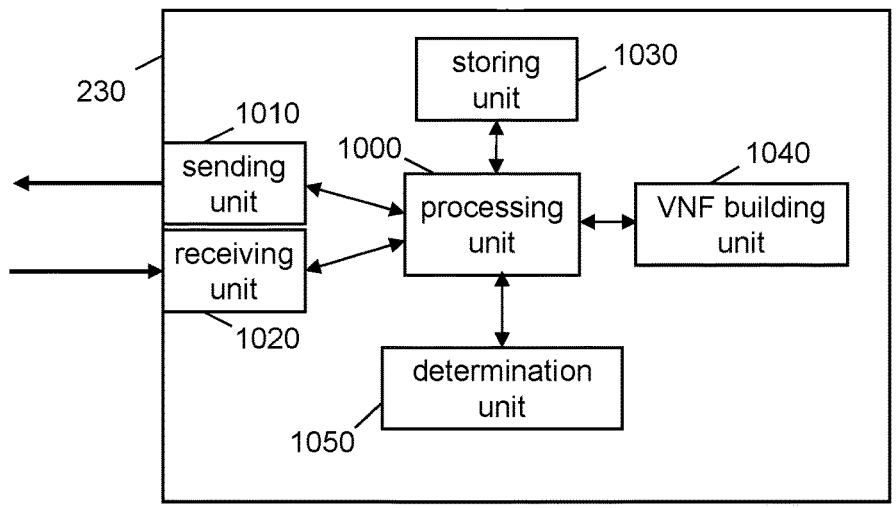
VNF Manager, Apparatus
Figure 10
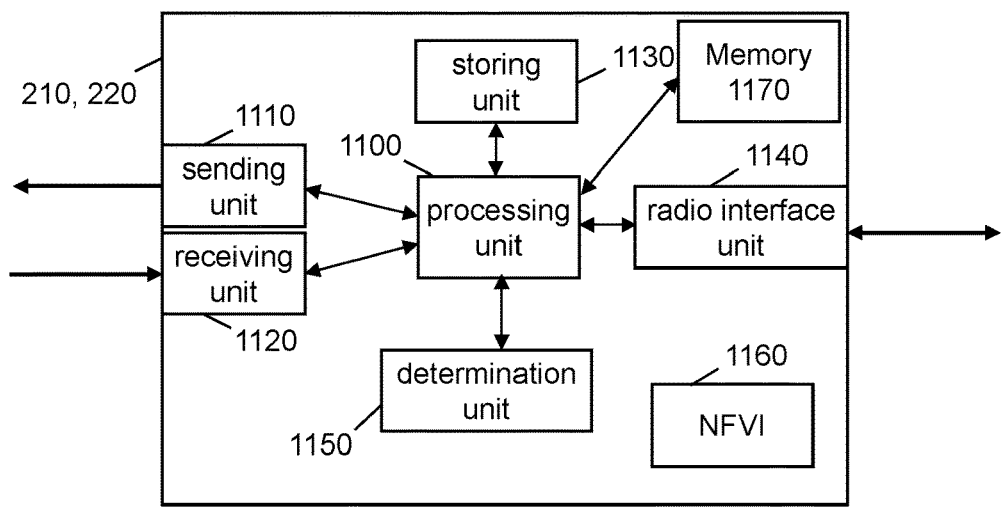
Radio Base Station, Apparatus
Figure 11
|  | First radio handover, then service provisioning transfer | First service provisioning transfer, then radio handover |
|---|---|---|
| Break source radio before making target radio | N/A | Second scenario |
| Keep source radio when making target radio | First scenario | N/A |
Figure 12

SERVICE DELIVERY TO HANDED OVER USER EQUIPMENT (UE) USING A SOFTWARE-DEFINED NETWORKING (SDN) CONTROLLER

CROSS-REFERENCE TO RELATED APPLICATIONS

This application is a National stage of International Application No. PCT/IB2016/051754, filed Mar. 29, 2016, which is hereby incorporated by reference. The present application is related to an application entitled "Providing Services to a Roaming User Equipment", filed on Sep. 28, 2015.

FIELD OF INVENTION

The embodiments of the invention are related to the field of networking. More specifically, the embodiments of the invention relate to systems, methods, nodes, and computer programs for providing services to a roaming user equipment (UE) using a software-defined networking (SDN) controller.

BACKGROUND

An ongoing trend in the telecommunication industry is to "move network functions into the cloud", meaning that instead of using dedicated and specialized (but expensive) processing hardware, to run the corresponding network functions in generic data centers comprising bulks of general purpose (but cheap) processing hardware. These data centers may even be owned and operated by a different company and the processing power would be rented dynamically, depending on the need and the price.

With the ever increasing processing power of computing hardware, it also becomes possible to use the spare resources of network nodes to act as platform for hosting more/other network functions. In this scenario the network node would also act as a mini-datacenter.

The European Telecommunications Standards Institute (ETSI) standardization forum has recognized this trend to virtualize network functions and is standardizing an architectural framework for network function virtualization (NFV), see ETSI GS NFV004 V1.1.1 (dated March 2016), and FIG. 1. Network Function Virtualization envisages the implementation of network functions as software-only entities that run on the NFV Infrastructure (NFVI) 130. As such, four main domains are identified in FIG. 1:

(1) Virtualized Network Functions (VNFs) 100, as the software implementation of a network function which is capable of running on the NFVI.

(2) NFV Infrastructure (NFVI) 130, including the diversity of physical resources and how these can be virtualized. NFVI supports the execution of the VNFs. The NFVI 130 comprises hardware resources 140, which are abstracted by a Virtualization Layer 150. The NFVI 130 offers Virtual Compute 160, Virtual Storage 170, and Virtual Network 180 resources to the VNFs 110 hosted by the NFVI 130.

(3) VNF Manager 120, which covers the orchestration and management of physical and/or software resources (via a NFVI Manager 190) that support the infrastructure virtualization and the lifecycle management of VNFs. VNF Manager focuses on all virtualization-specific management tasks necessary in the NFV framework.

(4) NFVI Manager 190, which covers the orchestration, management, and lifecycle management of physical and/or software resources that support the infrastructure virtualization.

The NFV framework enables dynamic instantiation and management of VNF instances and the relationships between them regarding data, control, management, dependencies and other attributes.

When combining the concepts of network function virtualization with the concept of using network nodes as platform for hosting such virtualized network functions, the network node platform would be used as NFVI 130 and a VNF manager 120 would dynamically deploy VNFs 110 onto the NFVI 130.

The network nodes used as a host for VNFs may be the powerful server nodes controlling the communication networks. Since these powerful servers are typically very few and located centrally, there is not much difference over using central data centers. An alternative approach is to utilize those network nodes that are widely geographically distributed and where the sheer number of nodes in the network offers a huge collective processing power. The use of radio access network nodes (radio base stations (RBS) such as Node B (or referred to as NodeB), evolved Node B (or referred to as eNodeB), or base transceiver station (BTS)) are a promising candidate. The prime advantage of utilizing radio base stations would be that the NFV can be located very close to the subscriber, and by that minimize latency and reduce network based transmission bandwidth.

Latency is in particular an issue for specific types of sensors of machine-to-machine (M2M) communication and machine type communication (MTC). In order to keep MTC devices simple and cheap, but also in order to save battery power in autarkic MTC devices, any processing needed for MTC is off-loaded into the network. However, some of the processing off-loaded into the network is time critical, e.g. reaction on certain sensor measurements. For these applications it is critical to have the processing as close as possible to the MTC device.

Software-defined networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

It is a challenge to utilize the SDN architecture including the radio access network nodes and virtualize network functions and deliver services in an efficient way.

SUMMARY

Methods of delivering services to a roaming UE are disclosed. In one embodiment, a method implemented in a virtual network function (VNF) manager and the services are offered by a set of VNFs hosted on a source radio base station and are delivered to the roaming UE via a radio interface of the source radio base station, where the roaming UE is to roam from a radio coverage area of the source radio base station into a radio coverage area of a target radio base station. The method includes identifying a trigger condition for handing-over delivery of at least a subset of the services from the radio interface of the source radio base station to a radio interface of the target radio base station. The method also includes transferring the subset of the services to the target radio base station through a route based on information from a software-defined networking (SDN) controller of a SDN system that includes the source radio base station and the target radio base station. The method further includes causing at least one VNF to be deployed on the target radio base station, the at least one VNF on the target radio base station being adapted to offer the subset of the services to the roaming UE.

Apparatus for delivering services to a roaming UE are disclosed. In one embodiment, a virtual network function (VNF) manager is used for the service deliver. The services are to be offered by a set of VNFs hosted on a source radio base station and are to be delivered to the roaming UE via a radio interface of the source radio base station, where the roaming UE is to roam from a radio coverage area of the source radio base station into a radio coverage area of a target radio base station. The VNF manager includes a processor and a non-transitory machine-readable storage medium that coupled to the processor, and the non-transitory machine-readable storage medium contains instructions, which when executed by the processor, cause the VNF manager to perform operations. The VNF manager identifies a trigger condition for handing-over delivery of at least a subset of the services from the radio interface of the source radio base station to a radio interface of the target radio base station. The VNF manager also transfers the subset of the services to the target radio base station through a route based on information from a software-defined networking (SDN) controller of a SDN system that includes the source radio base station and the target radio base station. The VNF manager causes at least one VNF to be deployed on the target radio base station, the at least one VNF on the target radio base station being adapted to offer the subset of the services to the roaming UE.

Non-transitory machine-readable storage media for delivering services to a roaming UE are disclosed. In one embodiment, a non-transitory machine-readable medium having instructions stored therein, which when executed by a processor, cause the processor to perform operations in a virtual network function (VNF) manager for delivering services to a roaming UE. The services are offered by a set of VNFs hosted on a source radio base station and are delivered to the roaming UE via a radio interface of the source radio base station, where the roaming UE is to roam from a radio coverage area of the source radio base station into a radio coverage area of a target radio base station. The operations include identifying a trigger condition for handing-over delivery of at least a subset of the services from the radio interface of the source radio base station to a radio interface of the target radio base station. The operations also include transferring the subset of the services to the target radio base station through a route based on information from a software-defined networking (SDN) controller of a SDN system that includes the source radio base station and the target radio base station. The operations further include causing at least one VNF to be deployed on the target radio base station, the at least one VNF on the target radio base station being adapted to offer the subset of the services to the roaming UE.

Embodiments of the disclosed techniques provides efficient ways to deliver services using network function virtualization and SDN.

BRIEF DESCRIPTION OF THE DRAWINGS

The invention may best be understood by referring to the following description and accompanying drawings that are used to illustrate embodiments of the invention. Like reference numbers and designations in the various drawings indicate like elements. In the drawings:

FIG. 8 illustrates a flow diagram of a method embodiment in a source radio base station for provisioning of services to a roaming UE according to one embodiment of the invention.

FIG. 9 illustrates a flow diagram of a method embodiment in a target radio base station for provisioning of services to a roaming UE according to one embodiment of the invention.

FIG. 10 illustrates a schematic block diagram of a VNF manager apparatus embodiment for provisioning of services to a roaming UE according to one embodiment of the invention.

FIG. 11 illustrates a schematic block diagram of a radio base station apparatus embodiment for provisioning of services to a roaming UE according to one embodiment of the invention.

FIG. 12 illustrates two scenarios of radio handover and service transfer scenario according to embodiments of the invention.

DETAILED DESCRIPTION

Figure 1:
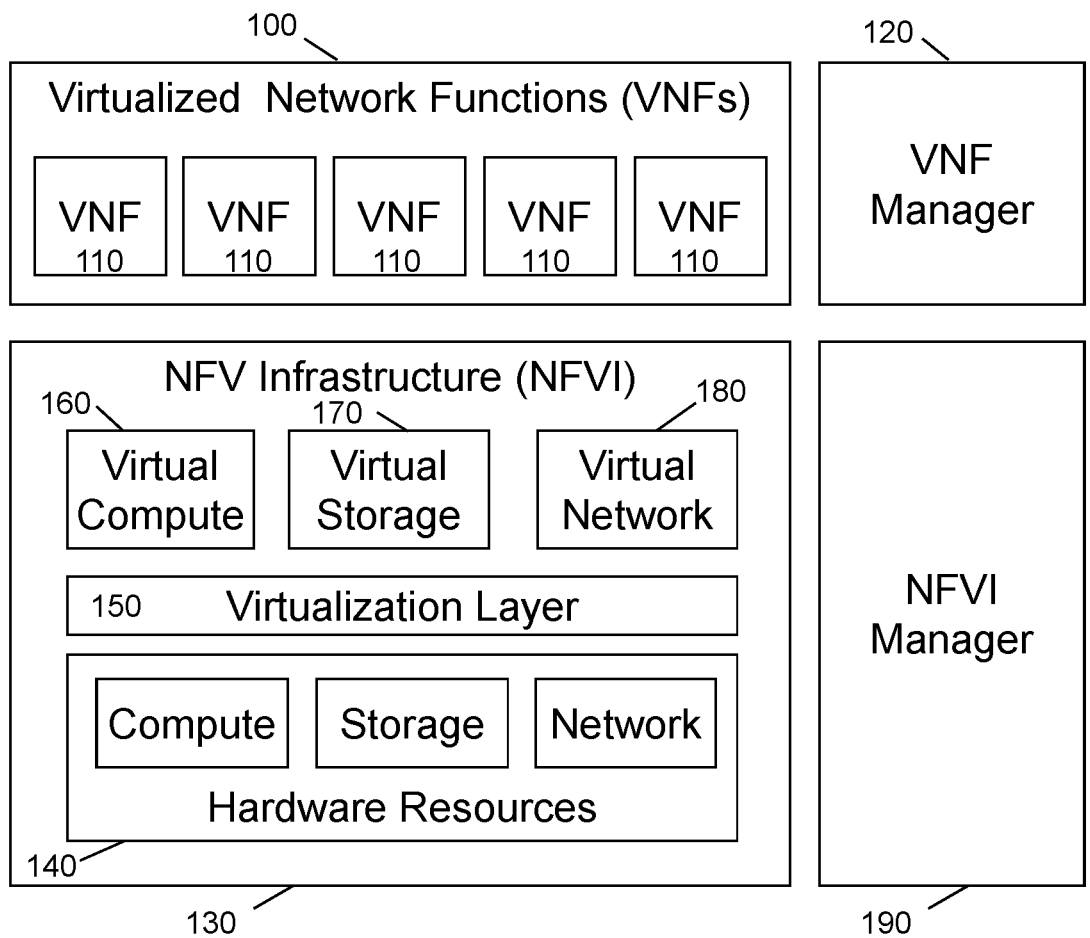
FIG. 1 illustrates a high-level NFV framework.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data./For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random-access memory (DRAM), static random-access memory (SRAM)) of that electronic device. Typical electronic devices also include a set or one or more physical network interface(s) to establish network connections (to transmit and/or receive code and/or data using propagating signals) with other electronic devices.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Terms

Within the context of the present application, the term "service" refers to communication services or application services. A communication service may be a packet transport service such as Internet browsing, file transfer, file download, streaming of audio/video or the like. A communication services may also be voice call, multimedia call, chat, messaging, conference, or the like. Application services may be any service offered by an application or a server such as processing tasks on behalf of UE (such as MTC), gaming, sensor data upload, sensor data analysis, remote control (also as a result of the sensor data analysis), or surveillance tasks, or the like.

Within the context of the present application, the term "user equipment" (UE) refers to an electronic device for instance used by a person for his or her personal communication. It can be a telephone type of device, for example a telephone or a SIP phone, cellular telephone, a mobile station, cordless phone, or a personal digital assistant type of device like laptop, notebook, notepad equipped with a wireless data connection. The UE may also be associated with humans but also with non-humans like animals, plants, or even machines (MTC/M2M). A UE may be equipped with a SIM (Subscriber Identity Module) comprising unique identities such as IMSI (International Mobile Subscriber Identity) and/or TMSI (Temporary Mobile Subscriber Identity) associated with the person using the UE such as a subscriber using the UE. The presence of a SIM within a UE customizes the UE uniquely with a subscription of the subscriber. Such subscriber may also use multiple devices/UEs at the same time.

Within the context of the present application, the term "subscriber" may refer to a human being having a service agreement with a service provider such as an operator. The subscriber may also be a legal entity such as a company operating a pool of MTC devices, and these devices operate independent from any human subscriber. In this case the MTC device is the direct receiver of the service while the service subscription is centrally with the company (indirect receiver of such service) operating the pool of MTC devices.

Within the context of the present application, the term "communication network" or short "network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as 2G (2nd Generation), GSM (Global System for Mobile communications), 3G (3rd Generation), WCDMA (Wideband Code Division Multiple Access), CDMA (Code Division Multiple Access), LTE (Long Term Evolution), WLAN (Wireless Local Area Network), Wi-Fi (Wireless Fidelity)), mobile backhaul network, or core network such as IMS (IP Multimedia System), CS (Circuit Switched) Core, PS (Packet Switched) Core and 5G. The communication network may also include ones using other wireless communication protocols (such as Bluetooth, ZigBee (ZigBee 2004, 2006, PRO), Z-wave (Z-Wave Alliance), Wi-Fi (IEEE 802.11), wireless personal area network technology (e.g., IEEE 801.15.4), Digital European Cordless Telecommunications (DECT), and WiMax) and ones using wireline media such as optical fibers, copper lines, or power lines.

Within the context of the present application, the term "roaming" refers to a movement of a UE within a coverage area of a communication network. In order to receive services, the UE is registered in a control node being responsible for the geographical area where the UE is currently located and is attached via a radio interface to a radio base station. While moving, the UE may leave the radio coverage area of the current radio cell offered by a current radio base station, the so called source radio base station, and move into a radio cell offered by a further radio base station, the so called target radio base station. This roaming may or may not have implications on the control node where the UE is registered. So if both, source radio base station and target radio base station are under control of the same control node, the registration in the control node is maintained. If source radio base station and target radio base station are under control of different control nodes, also the registration is moved. For a circuit switched services the control nodes are typically MSC (Mobile Services Center) nodes, for packet switched communication services control nodes are typically MME (Mobility Management Entity) nodes for the packet delivery and application servers as provided for example by the IP Multimedia Subsystem (IMS).

Within the context of the present application, the term "control node" refers to a node of the communication network primarily performing control procedures for sessions or calls and services of a subscriber of the communication network. The term typically refers to those entities of the communication network handling control plane, subscriber data, services, or signaling traffic associated with subscriber traffic in the communication network. In a core network a control node may be a MSC, MME (Mobility Management Entity), SGSN (Serving Gateway Support Node), P-CSCF (Proxy Call State Control Function), S-CSCF (Serving-CSCF), or TAS (Telephony Application Server) node.

Within the context of the present application, the term "packet control node" refers to a control node of the packet core network. Examples of packet control node are MME or SGSN.

Within the context of the present application, the term "subscriber database" refers to a database run by the network operator to store the information related to the subscribers of a network run by the operator. A subscriber database can be for example a Home Location Register (HLR), a Visited Location Register (VLR), a Home Subscriber Server (HSS), or a combination of HLR and HSS. A subscriber database may also be internally structured into a front end part handling the signaling with the other network nodes of the communication network and a generic database for storage of the data according to data layered architecture principles.

Within the context of the present application, the term radio base station refers to a node of a radio access network that is used as interface between land-based transport links and radio based transport links, wherein the radio based transport link interfaces directly a UE. For example, in a GSM/2G access network a radio base station refers to as a BTS, in a WCDMA/3G access network a radio base station refers to as a NodeB, and in a LTE access network a radio base station refers to as an eNodeB. In a WLAN/Wi-Fi architecture a radio base station refers to as an Access Point (AP).

Within the context of the present application, the term "virtual network function (VNF)" may particularly denote a concept taking on the responsibility of handling one or more specific network functions. Such concept may be realized by running that VNF on one or more virtual machines (VMs) on top of a hardware networking infrastructure—e.g. routers, switches, servers, hosting infrastructure, etc. In alternative, the term VNF may also stand for a software container concept that allows running software processes/function in isolation from each other on a common hosting infrastructure. Containers, unlike a virtual machine, do not require or include a separate operating system. Instead, it relies on kernel's functionality and uses resource isolation (CPU, memory, block input/output (I/O), network, etc.) and separate namespaces to isolate the application's view of the operating system. Due to the fact that containers do not include an operating system, the size of a container is typically smaller than of an entire virtual machine. Along these lines, the term VNF may also stand for a micro-service concept. The micro-service architectural concept is an approach to develop a function as a suite of smaller functions, each running in its own process and communicating with lightweight mechanisms (e.g. Hypertext transfer protocol (HTTP) resource application programming interface (API)). These functions are independently deployable by fully automated deployment machinery (e.g. a manager herein called VNF manager).

Provisioning Services for a Roaming UE

Individual virtual network functions may be connected, combined, or chained together as building blocks to offer a full-scale service. Instead of using multiple individual VNFs and chaining the VNFs together for a full-scale service, it is also possible to merge/combine several of the sub-functions into single VNF. Such VNF would comprise all elements and sub-functions for the provisioning of a service, or even multiple/all services provided to a UE. Typically, such VNF would still serve multiple UEs and multiple subscribers.

In an alternative deployment the VNF could comprise all functions for the provisioning of multiple/all services provided to the UE, but the VNF would be dedicated for that single UE or a single subscriber. This concept may be taken a step further, and a VNF could be dedicated for a single service for a single UE. In such scenario, considering that the multiple services are provided to the single UE, several VNFs are involved in provisioning of the services to that UE.

Several permutations are possible for the scenario involving several VNFs per UE: (1) one VNF per UE and service; (2) one VNF per subscription, so private services provided by one VNF and enterprise services provided by another VNF, in addition there may still be one VNF per service; (3) one VNF per service type or based on specific requirements of the service (e.g. premium class services versus best-effort services. Thus there are one or several VNFs per UE for provisioning the services to the UE.

In the further description the term "source" radio base station and "target" radio base station are used to distinguish the different roles a radio base station can take. It shall be clear to a technically skilled person to understand that a "target" radio base station can act as a "source" radio base station when the roaming movement of the UE continues. So the UE may also revert its moving direction and by that cause the former "target" radio base station to become a "source" radio base station for the movement back, and the former "source" radio base station becoming a "target" radio base station.

Figure 2:
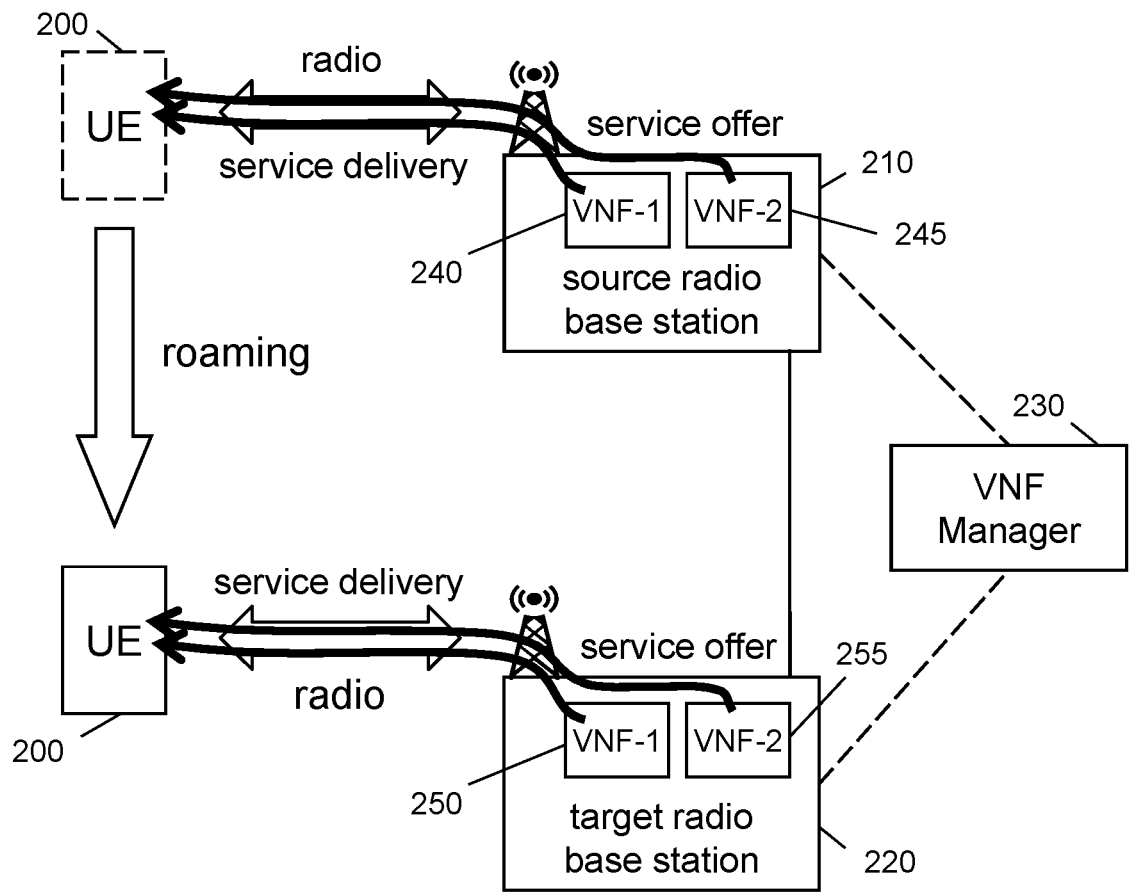
FIG. 2 illustrates a network system for provisioning of services to a roaming UE according to one embodiment of the invention.

Referring now to FIG. 2, which illustrates a network system for provisioning of services to a roaming UE, according to one embodiment of the invention. A UE 200 is roaming around and moves from the upper position to the lower position. In the upper position the UE 200 is connected to the source radio base station 210 via a radio interface. In this embodiment the services are offered by VNF-1 240 and VNF-2 245 hosted on the source radio base station 210, and the services are delivered to the roaming UE via a radio interface of the source radio base station 210. It is to be noted that a service is described herein as either being delivered to or provisioned at a UE, and the delivery and provisioning of a service are used interchangeably herein and means the VNF manager, through one or more VNFs, causes the service being offered at the UE.

The roaming UE is then roaming from a radio coverage area of the source radio base station 210 into a radio coverage area of a target radio base station 220. In the lower position the UE 200 is connected to the target radio base station 220 via a radio interface, where the services are offered by VNF-1 250 and VNF-2 255 hosted on the target radio base station 220, and the services are delivered to the roaming UE via a radio interface of the target radio base station 220.

This embodiment shows the case where two VNFs 240, 245 (and VNFs 250, 255 after handing-over the service provisioning) are used to provision services to the roaming UE 200. For example, VNF-1 240 may offer a first set of services, and VNF-2 245 may offer a second set of services. As described above, there may be one of more VNFs per roaming UE.

The movement of the UE 200 causes that at some point of time during the movement, there is a need for handing-over the delivery of the services from the radio interface of the source radio base station 210 to the radio interface of the target radio base station 220. This is done by determining a trigger condition for handing-over the delivery of the services from the radio interface of the source radio base station 210 to the radio interface of the target radio base station 220.

The trigger condition for handing-over may be met if the roaming UE 200 leaves the radio coverage area of the source radio base station 210, where the radio signal strength of the radio interface of the source radio base station 210 is fading and at the same time the radio signal strength of the radio interface of the target radio base station 220 is found to be on an acceptable level. In this case this trigger condition may be a radio signal strength threshold, and the trigger condition would be met if the threshold is reached or exceeded.

If this trigger condition is met, a VNF manager 230 is caused to deploy VNF-1 250 and VNF-2 255 on the target radio base station 220. This causing may be done by the source radio base station 210 by sending an appropriate signaling message to the VNF manager 230 informing that the condition for handing-over the provisioning of the services has been met.

As an alternative, the source radio base station 210 and target radio base station 220 may continuously send radio signal strength measurements to the VNF manager 230 and the VNF manager 230 determines when to trigger handing-over the provisioning of the services. The VNF manager 230 may apply a similar radio signal strength threshold as trigger condition.

The VNF-1 250 and VNF-2 255 on the target radio base station 220 are adapted for offering the provisioned services to the roaming UE 200. After deploying VNF-1 250 and VNF-2 255 on the target radio base station 220, the services are continued to be provisioned to the roaming UE 200. This is done by delivering the services via the radio interface of the target radio base station 220 to the roaming UE 200.

After the handing-over is completed, so that VNF-1 250 and VNF-2 255 are deployed on the target radio base station 220, the corresponding VNF-1 240 and VNF-2 245 may be deleted on/removed from the source radio base station 210. This may be initiated by the VNF manager 230 after the handing-over is completed, for example after reception of a confirmation from the target radio base station 220 that the services are continued to be provisioned to the roaming UE 200. By alternative, this may be triggered by the source radio base station 210 itself, for example after providing a clone copy of VNF-1 240 and VNF-2 245 to the VNF manager 230 or the destination radio base station 220.

The VNF manager 230 is caused to deploy VNF-1 250 and VNF-2 255 on the target radio base station 220. The VNF manager 230 may do this by deploying a clone of VNF-1 240 and VNF-2 245 hosted on the source radio base station 210 to the target radio base station 220. The VNF manager 230 may request the source radio base station 210 to provide a copy of the VNF-1 240 and VNF-2 245 and forward these to the target radio base station 220 to be deployed as VNF-1 250 and VNF-2 255.

In alternative, instead of retrieving a copy of the VNF-1 240 and VNF-2 245 from the source radio base station 210, the VNF manager 230 may build VNF-1 250 and VNF-2 255 based on construction information on the provisioned services. That construction information may be retrieved from a database 260 (shown in FIG. 5) and described in further detail below.

The VNF manager 230 may build VNF-1 250 and VNF-2 255 by retrieving function components from a library 270 comprising function components of a communication network (shown in FIG. 5) and described in further detail below.

The UE 200 may continue to roam and the above method is repeated several times. Thus the VNFs serving the roaming UE 200 are moved along with the roaming movement of the UE 200 and the radio coverage.

It shall be noted that this embodiment shows the scenario where two VNFs are dedicated to the roaming UE 200, and that both of them are handed-over from the source radio base station 210 to the target radio base station 220. In this case the distribution of the offering of the services over the VNFs 240, 245 is based on for example the services provisioned to the roaming UE 200. By alternative, the services may be distributed base on a subscription profile of a subscriber using the roaming UE 200. It is to be noted that in other embodiments there may be more than two VNFs, or even just a single VNF.

The UE 200 may continue to roam and the above method is repeated.

Figure 3:
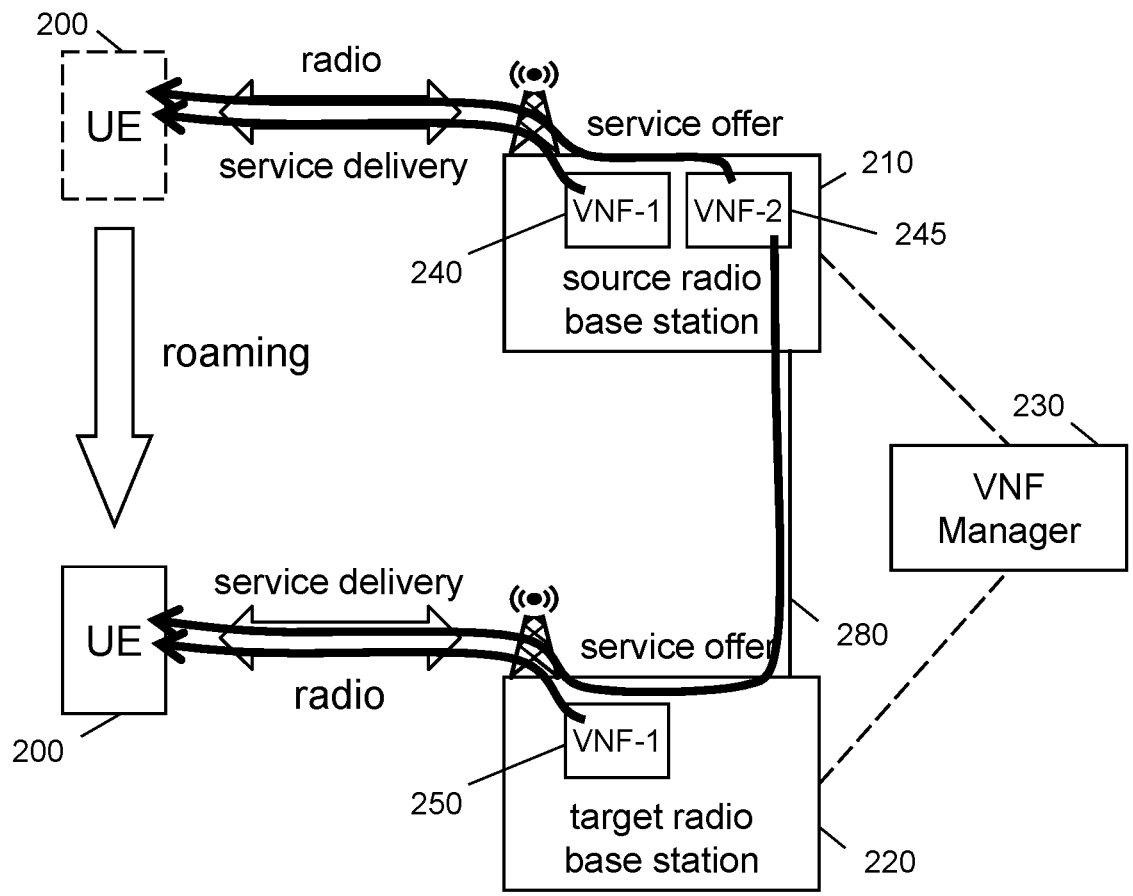
FIG. 3 illustrates a network system for provisioning of services to a roaming UE according to another embodiment of the invention.

Referring now to FIG. 3, which illustrates a network system for provisioning of services to a roaming UE, according to another embodiment of the invention. FIG. 3 shows a similar scenario as in FIG. 2. The UE 200 is roaming around and moves from the upper position to the lower position. In the upper position the UE 200 is connected to the source radio base station 210 via a radio interface. The services are offered by VNF-1 240 and VNF-2 245 hosted on the source radio base station 210 and the services are delivered to the roaming UE via a radio interface of the source radio base station 210.

The roaming UE is then roaming from a radio coverage area of the source radio base station 210 into a radio coverage area of a target radio base station 220. In the lower position the UE 200 is connected to the target radio base station 220 via a radio interface.

However, in this embodiment, in the lower position the services are offered by VNF-1 250 hosted on the target radio base station 220 and in addition offered by VNF-2 245 still located on the source radio base station 210. The VNF-2 245 is connected via a network interface 280 to the target radio base station 220. The services are then delivered to the roaming UE via a radio interface of the target radio base station 220. The network interface 280 may be a channel utilizing one or more network transmission links such as a direct land-based connection or microwave radio based transmission links between the two radio base stations 210 and 220. Radio base stations are typically hooked up to a backhaul network connecting them to the core network. Thus such network interface 280 between two radio base stations may also be realized by routing/switching via backhaul network connections or even by routing/switching via a core network node. The network interface 280 may be based on routed packets connections or pre-established packet tunnels using well-known layer 2 or layer 3 tunnel mechanisms.

In this embodiment, the VNF manager 230 is handing-over a subset of the services from the source radio base station 210 to the target radio base station 220. The remaining (not handed-over) services are continued to be offered by the VNF-2 245 in the source radio base station 210 and are delivered to the roaming UE 200 via the radio interface of the target radio base station 220.

The VNF manager 230 decides the service subset to be handed-over based on the service provisioned to the roaming UE 200, or the subscription profile of the subscriber using the roaming UE 200.

In this scenario the VNF manager 230 deploys just VNF-1 250 on the target radio base station 220. VNF-1 250 may be a clone copy of VNF-1 240 from the source radio base station 210, or may be newly built by the VNF manager 230 as described in FIG. 5 below.

It shall be noted that this embodiment shows the scenario where two VNFs are dedicated to the roaming UE 200, and that one of them is handed-over from the source radio base station 210 to the target radio base station 220. In this case the distribution of the offering of the services over the VNFs 240, 245 may also be based on the services provisioned to the roaming UE 200 or on a subscription profile of a subscriber using the roaming UE 200.

In other embodiments there may be more than two VNFs, for example five VNFs, and two of them are handed-over to the target radio base station 220, while three of them remain on the source radio base station 210. Various other combinations of number of handed-over VNFs and VNFs remaining can be thought of, if determined useful for the provisioned services or subscription profile by the VNF manager 230.

For example, services that have very demanding latency requirements may be handed-over to the target radio base station 220, while others having less stringent latency requirements may be left at the source radio base station 210 and are delivered via network interface 280.

The UE 200 may continue to roam and the above method is repeated. So the VNFs remaining on the source radio base station 210 stay even further on that source radio base station 210, while the handed-over VNFs are handed-over again to a next target radio base station 220, and so on.

Optionally, at each trigger condition for handing-over VNFs, the VNF manager 230 may take another decision whether to hand-over the VNF in the source radio base station 210. So if, after the UE having moved for a longer distance, or if the service delivery via the network interface 280 from the source radio base station 210 to the next target radio base station 220 experiences an increased latency (for example if transported over slow speed connections or delay intensive microwave links), the VNF manager 230 may decide to commonly hand-over VNFs from the source radio base station 210 and from a previous target radio base station 220 to a new target radio base station 220. In this scenario all VNFs offering services to the UE 200 would be gathered at the new target radio base station 220 and the system is again in the starting situation as depicted in FIGS. 2 and 3.

Figure 4:
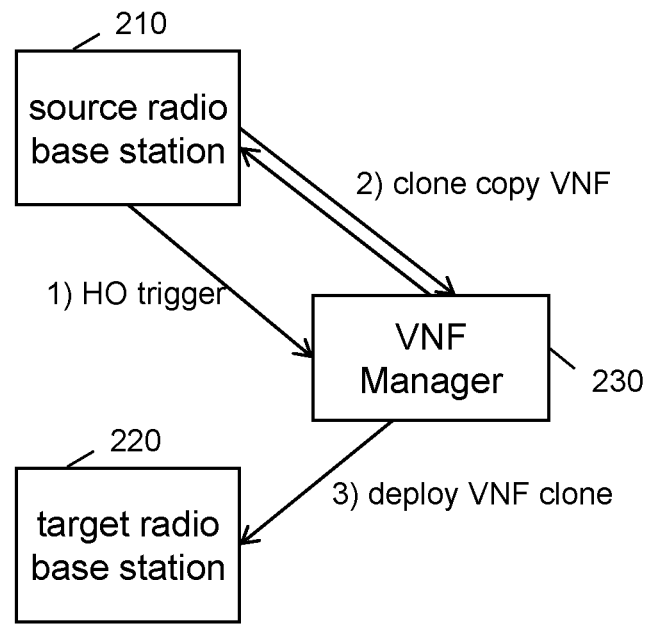
FIG. 4 illustrates a network system for deploying a VNF on the target radio base station according to one embodiment of the invention.

Referring now to FIG. 4, this figure illustrates a network system for deploying a VNF on the target radio base station, according to one embodiment of the invention. In this embodiment the cloning of a VNF from a source radio base station 210 to a target radio base station 220 is illustrated in more details.

The cloning may be triggered by an indication received by the VNF manager 230 from the source radio base station 210 that a handing-over of the delivery of the services from the radio interface of the source radio base station 210 to the radio interface of a target radio base station 220 is needed. This trigger may for example be based on the UE 200 leaving the radio coverage area of the source radio base station 210. By alternative, this first step may also be triggered by the target radio base station 220, for example when a UE 200 enters the radio coverage area of the target radio base station 220.

After having determined which of the VNFs to hand-over, the VNF manager 230 may in a second step request a clone copy of the one or more determined VNFs from the source radio base station 210. The source radio base station 210, receiving such request, may produce a clone copy by taking a current snapshot of the requested, running VNF, in order to capture the current dynamic state of the VNF. Then the source radio base station 210 returns that clone copy to the VNF manager 230. The VNF manager 230 may request more than one clone copy; in this case the source radio base station 210 may provide this plurality of clone copies in a single response, or in several responses or sub-responses (segmented response). By alternative, the VNF manager 230 may request one VNF at a time, however, this would prolong the handing-over time.

The VNF manager 230 may also request clone copies of one or more VNFs from several source radio base stations such as source radio base station 210, in case of continued roaming of the UE and previous partial handing-over of VNFs as described above.

In a third step the VNF manager 230 deploys the one or more VNFs on the target radio base station 220. The one or more VNFs on the target radio base station 220 are adapted for offering at least a subset of the provisioned services to the roaming UE 200.

Figure 5:
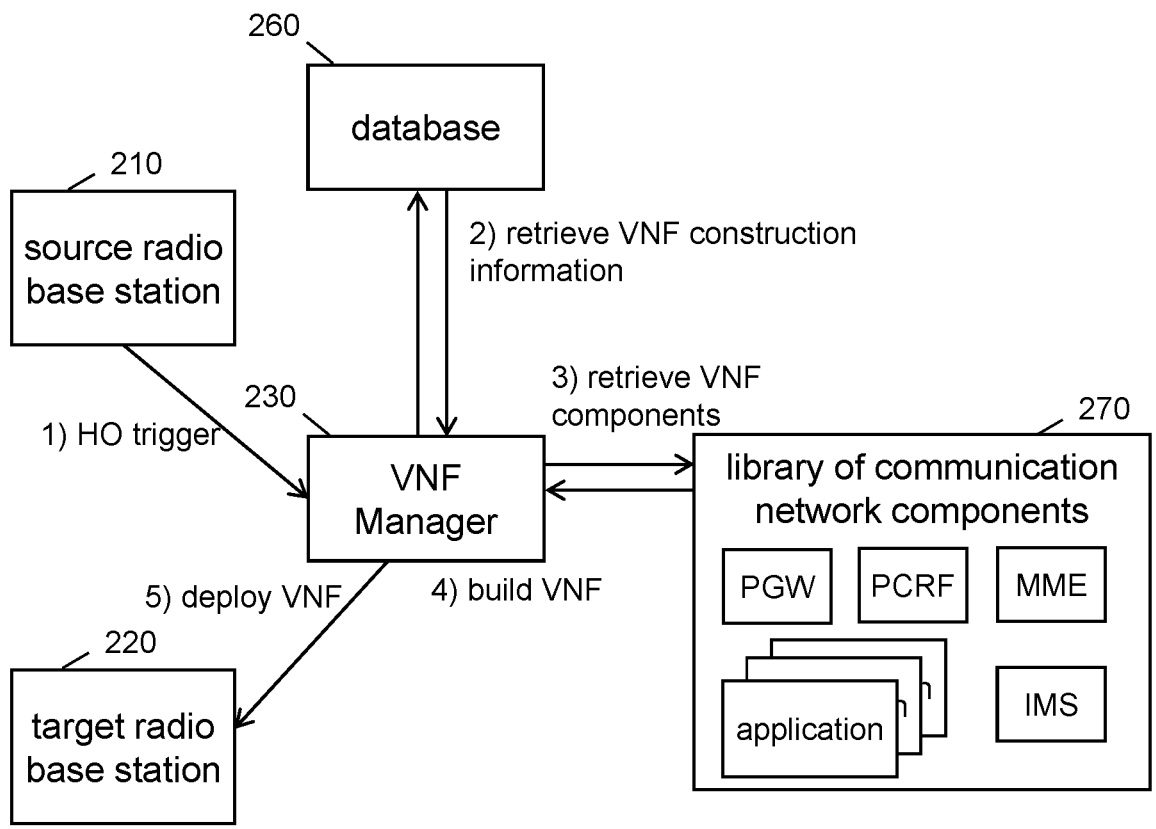
FIG. 5 illustrates a network system for deploying a VNF on the target radio base station according to another embodiment of the invention.

Referring now to FIG. 5, which illustrates a network system for deploying a VNF on the target radio base station, according to another embodiment of the invention. In this embodiment the building of a VNF by the VNF manager 230 is illustrated in more details.

In a first step VNF building may be triggered by an indication received by the VNF manager 230 from the source radio base station 210 that a handing-over of the delivery of the services from the radio interface of the source radio base station 210 to the radio interface of a target radio base station 220 is needed. This trigger may for example be based on the UE 200 leaving the radio coverage area of the source radio base station 210. By alternative, this first step may also be triggered by the target radio base station 220, for example when a UE 200 enters the radio coverage area of the target radio base station 220.

In this embodiment the VNFs to be deployed on the target radio base station 220 is not a clone copy of a VNF in the source radio base station 210 but a newly built VNF. The VNF manager 230 may decide to use the clone copy method or the method to build the VNFs anew. The VNF manager 230 may use different decision criteria such as number of provisioned services, complexity of the provisioned services, size of the resulting VNF and the like. The VNF manager 230 may also check the capabilities/type of NFVI provided by the target radio base station 220. Thus the NFVI provided by the target radio base station 220 may require a different building of the VNF than used on the source radio base station 210, so that a VNF clone copy of source radio base station 210 would not be compatible with the target radio base station 220 in that case.

In the second step, the VNF manager 230 has to determine the components that the VNF shall comprise, that are all components required for offering the provisioned services to the UE 200. In order to do this, the VNF manager 230 may query a database. This database may be an Operation Support System (OSS), a Business Support System (BSS), or a Network Management System (NMS). Such database may be located still within the communication network.

It is to be noted that the VNF manager 230 has to determine the services that the subscriber has subscribed to and is currently using. As a result, the VNF manager 230 receives construction information on how to build the needed (one or more) VNF(s). Based on this construction information, the VNF manager 230 may in a third step retrieve the required software components from a library comprising communication network components. For example, the VNF construction information may demand that a Packet Gateway (PGW), a Mobility Management Entity (MME), a Policy and Charging Rules Function (PCRF), application-1, application-2, and application-3 would be required. The VNF manager 230 then retrieves these software components from the library.

In a fourth step the VNF manager 230 builds the VNF based on the construction information, the software components from the library, and particular building method required for the NFVI provided by the target radio base station 220. The readily built VNF is then in a fifth step deployed on the target radio base station 220.

These steps may be repeated if more than one VNF needs to be deployed, or these steps may be performed in parallel in order to build and deploy multiple VNFs. The one or more VNFs on the target radio base station 220 are adapted for offering at least a subset of the provisioned services to the roaming UE 200.

Flow Diagrams for a VNF Manager Managing Service Provisioning

Figure 6:
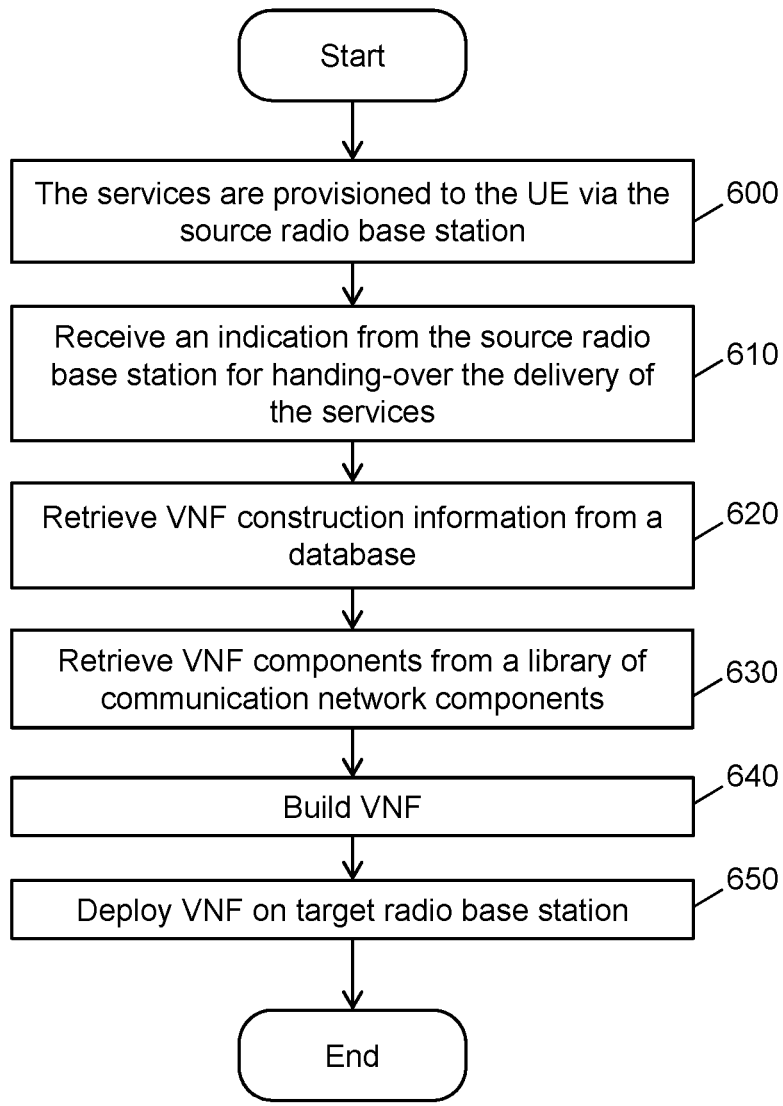
FIG. 6 illustrates a flow diagram of a method embodiment in a VNF manager for building a VNF according to one embodiment of the invention.

Referring now to FIG. 6, which illustrates a flow diagram of a method embodiment in a VNF manager 230 for building a VNF according to one embodiment of the invention. This flow diagram illustrates the steps for building one or more VNF corresponding to FIG. 5. The flow starts in step 600 where services are provisioned to the roaming UE 200 via the source radio base station 210.

In step 610 the VNF manager 230 receives an indication from the source radio base station 210 for handing-over the delivery of the services. The VNF manager 230 decides whether to retrieve a clone copy of the VNFs from the source radio base station 210, or whether to build new VNFs. In this embodiment, the VNF manager 230 decides to build new VNFs.

In step 620 the VNF manager 230 retrieves VNF construction information from a database. Based on this VNF construction information, the VNF manager 230 retrieves in step 630 VNF components from a library of communication network components.

In step 640 the VNF manager 230 builds the VNF based on the construction information using the components retrieved from the library. The VNF manager 230 also initializes the built VNF. In step 650 the VNF manager 230 deploys the built VNF on the target radio base station 220.

These steps may be repeated if more than one VNF needs to be deployed, or these steps may be performed in parallel for more than one VNF to be deployed.

The one or more VNFs on the target radio base station 220 are adapted for offering at least a subset of the provisioned services to the roaming UE 200.

Figure 7:
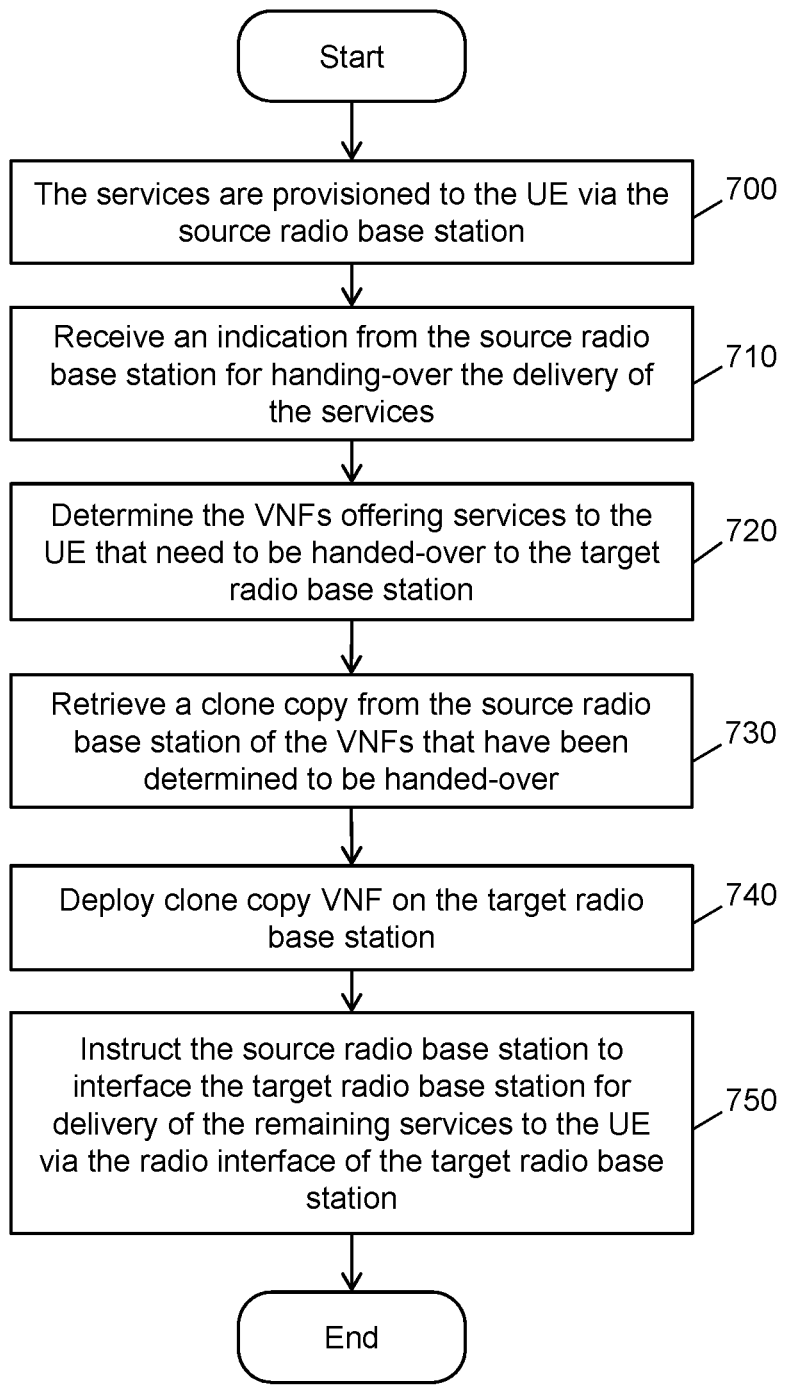
FIG. 7 illustrates a flow diagram of a method embodiment in a VNF manager for provisioning of services to a roaming UE according to one embodiment of the invention.

Referring now to FIG. 7, which illustrates a flow diagram of a method embodiment in a VNF manager 230 for provisioning of services to a roaming UE according to one embodiment of the invention. This flow corresponds to the network scenario as shown in FIG. 3.

The flow starts in step 700 where the services are provisioned to the roaming UE 200 via the source radio base station 210.

In step 710 the VNF manager 230 receives an indication from the source radio base station 210 for handing-over the delivery of the services. In this particular embodiment a subset of the services is to be handed-over from the source radio base station 210 to the target radio base station 220. The remaining services are continued to be offered by the VNFs in the source radio base station 210 and are delivered to the roaming UE 200 via the radio interface of the target radio base station 220.

In step 720 the VNF manager 230 determines the VNFs that need to be handed-over to the target radio base station 220. The VNF manager 230 may perform this determination based on the services that the VNF is offering to the UE 200. The services that have very demanding latency requirements may be handed-over to the target radio base station 220, while others having less stringent latency requirements may be left at the source radio base station 210 and are delivered via network interface 280.

After having decided which of the VNFs in the source radio base station 210 need to be handed-over to the target radio base station 220, in step 730 the VNF manager 230 may retrieve a clone copy from the source radio base station 210 of the VNFs that have been determined to be handed-over. Instead of retrieving a clone copy, the VNF manager 230 may also build a new VNF as described in FIGS. 5 and 6.

In step 740 the VNF manager 230 deploys the VNF on the target radio base station 220. Finally in step 750 the VNF manager 230 instructs the source radio base station 210 to interface the target radio base station 220 for delivery of the remaining services to the UE 200 via the network interface 280 to the target radio base station.

The one or more VNFs on the target radio base station 220 and the remaining one or more VNFs on the source radio base station 210, together are adapted for offering the provisioned services to the roaming UE 200.

Referring now to FIG. 8, which illustrates a flow diagram of a method embodiment in a source radio base station 210 for provisioning of services to a roaming UE, according to one embodiment of the invention.

The flow starts in step 800 when the source radio base station 210 determines a trigger condition for handing-over the delivery of the services to a target radio base station 220.

In step 810 the source radio base station 210 sends an indication to the VNF manager 230 to initiate handing-over of the one or more VNFs. This embodiment assumed the situation that the VNF manager 230 builds new VNFs. In this case the source radio base station 210 will not receive any request for providing a clone copy of the VNFs on the source radio base station 210.

In step 820 the source radio base station 210 receive an instruction from the VNF manager 230 to interface the target radio base station 220 for delivery of remaining services still offered by VNFs on the source radio base station 210. That interface may be the interface 280. It is to be noted that step 820 is optional and is used when the VNF manager 230 determines to hand-over a subset of the VNFs from the source radio base station 210 to the target radio base station 220.

Referring now to FIG. 9, which illustrates a flow diagram of a method embodiment in a target radio base station 220 for provisioning of services to a roaming UE according to one embodiment of the invention.

The flow starts in step 900 when the target radio base station 220 receives at least one VNF for deployment on the target base station 220 from the VNF manager 230. The target radio base station 220 then deploys the received VNFs, initializes and starts them.

In step 910 the deployed VNF continues to offer the provisioned services and delivery of the services is via the radio interface of the target radio base station 220 to the UE 200. In addition, the target base station 220 may in step 920 receive services via the network interface 280. These received services are offered by remaining VNFs in the source radio base station 210 and are delivery to the roaming UE 200 via the radio interface of the target radio base station 220. This last step is optional and is used when the VNF manager 230 determines to hand-over a subset of the VNFs from the source radio base station 210 to the target radio base station 220

Apparatus Block Diagrams

Referring now to FIG. 10, which illustrates a schematic block diagram of a VNF manager apparatus embodiment for provisioning of services to a roaming UE according to one embodiment of the invention. The VNF manager apparatus may be implemented in an electronic device or be the electronic device itself and it may be adapted to perform method steps according to the methods illustrated in block and flow diagrams discussed herein. The VNF manager 230 may comprise a number of functional units, which are described in further detail below and which are adapted to perform respective method steps.

A processing unit 1000 of the VNF manager 230 may be adapted to execute steps for provisioning of services to a roaming UE. The processing unit 1000 handles reception of an indication from a source radio base station 210 for handing-over the delivery of the services from the radio interface of the source radio base station 210 to the radio interface of a target radio base station 220. The processing unit 1000 also handles deployment of at least one VNF on the target radio base station 220.

In a practical implementation the processing unit 1000 may be one processor taking care of all the above functions, or may also be distributed over more than one processor, wherein the functions are distributed over the available processors. The VNF manager 230 may be a VNF itself, e.g. instantiated by a master VNF manager running on the same or a further NFVI.

The VNF manager 230 may further comprise a sending unit 1010 and a receiving unit 1020 via which the VNF manager 230 can communicate with other physical entities or external VNFs such as the source radio base station 210, the target radio base station 220, or VNFs deployed therein. The sending unit 1010 may send out signaling messages composed by the processing unit 1000. The receiving unit 1020 may receive signaling messages from those external entities above and forward the received signaling messages to the processing unit 1000 for decoding and/or dispatching. The VNF manager 230 may further comprise a network interface to a database 260 for retrieval of construction information for building a VNF, or to a library 270 comprising function components of a communication network for building a VNF. The receiving unit 1020 may retrieve a clone copy of a VNF from a source radio base station 210, and the sending unit 1010 may send the clone copy of the VNF to the target radio base station 220 for deployment. The sending unit 1010 may also send a VNF to the target radio base station 220, which has been built by the VNF building unit 1040.

The VNF manager 230 may also comprise a storing unit 1030 for storing information related to provisioning of services to a roaming UE. The storing unit 1030 may keep a cache of frequently used VNFs, or a VNF skeleton/framework which can be tailored to specific task/service provisioning by adding configuration or by proper initialization. The storing unit 1030 may be a pure software functional module such as a SQL database software module. The storing unit 1030 may also have access to and/or use a centralized storage (e.g. a Network Attached Storage, NAS) comprising various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 1030 may be used by the processing unit 1000 to store information, for example program code or data related to VNF manager 230 tasks. The storing unit 1030 may also host a database of construction information 260 and/or a library of communication network components 270.

The VNF manager 230 may further comprise a VNF building unit 1040. This VNF building unit 1040 may retrieve VNF construction information for building a VNF, retrieve either externally, or internally if hosted by the storing unit 1030. Based on this VNF construction information the VNF building unit 1040 may retrieve the required software components from a library 270 comprising function components of a communication network for building a VNF. Also this library 270 may be hosted by the storing unit 1030. The VNF building unit 1040 may then build a VNF and initialize that VNF for deployment. The VNF is then deployed to the target radio base station 220 via the sending unit 1010.

The VNF manager 230 may also comprise a determination unit 1050. This determination unit 1050 is used to determining a trigger condition for handing-over the delivery of the services from the radio interface of the source radio base station 210 to a radio interface of a target radio base station 220. The trigger condition for handing-over may be met if the roaming UE 200 leaves the radio coverage area of the source radio base station 210, so if the radio signal strength of the radio interface of the source radio base station 210 is fading and at the same time the radio signal strength of the radio interface of the target radio base station 220 is found to be on an acceptable level.

Referring now to FIG. 11, which illustrates a schematic block diagram of a radio base station apparatus embodiment for provisioning of services to a roaming UE, according to one embodiment of the invention. The radio base station may be adapted to perform method steps according to the methods discussed in relation to FIG. 8 or 9. The illustrated radio base station may be adapted to act as a source radio base station 210 and as a target radio base station 220, at the same time for different UEs, and at different times for the same UE.

The radio base station 210, 220 may comprise a number of functional units, which are described in further detail below and which are adapted to perform respective method steps.

A processing unit 1100 of the radio base station 210, 220 may be adapted to execute steps for provisioning of services to a roaming UE according to one embodiment of the invention. The processing unit 1100 causes, if a trigger condition is met, a VNF manager 230 to deploy at least one VNF 250, 255 on a target radio base station 220. The processing unit 1100 may also deploy a received VNF on its NFVI 1160. In a practical implementation the processing unit 1100 may be one processor taking care of all the above functions, or may also be distributed over more than one processor, wherein the functions are distributed over the available processors.

The radio base station 210, 220 may further comprise a sending unit 1110 and a receiving unit 1120 via which the radio base station 210, 220 can communicate with other physical entities or external VNFs such as the VNF manager 230 or a further radio base station 210, 220. The sending unit 1110 may send out signaling messages composed by the processing unit 1100. The receiving unit 1120 may receive signaling messages from those external entities above and forward the received signaling messages to the processing unit 1100 for decoding and/or dispatching. When working as a source radio base station 210, the radio base station may further comprise a network interface 280 to a target radio base station 220 for delivery of services offered by local VNFs for delivery via a radio interface of the further radio base station to the UE 200. When working as a target radio base station 220, the radio base station may use that same network interface 280 for receiving services from a source radio base station 210 for delivery to the UE 200 via the radio interface unit 1140. That network interface may be a separate unit or combined with that sending unit 1110 and a receiving unit 1120. The receiving unit 1120 may receive for deployment on the NFVI 1160 one or more VNF. Such VNF may be a clone copy of a VNF from a source radio base station 210, or a VNF built by a VNF manager 230.

The radio base station 210, 220 may also comprise a storing unit 1130 for storing information related to provisioning of services to a roaming UE. The storing unit 1130 may be a pure software functional module such as a SQL database software module. The storing unit 1130 may also have access to and/or use a centralized storage (e.g. a Network Attached Storage, NAS) comprising various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 1130 may be used by the processing unit 1100 to store information, for example program code or data related to radio base station 210, 220 tasks.

The radio base station 210, 220 may further comprise a radio interface unit 1140 comprising a sending a receiving part. The radio interface unit 1140 is utilized for radio communication with the UE 200. So the radio interface unit 1140 may send messages and data related to the provisioned services to the UE 200 and receive messages and data related to the provisioned services from the UE 200. The services may be offered by VNFs locally in the radio base station 210, 220, or are received via a network interface 280 from a further radio base station 210, 220, hosting VNFs that have not been handed-over.

The radio base station 210, 220 may also comprise a determination unit 1150. The determination unit 1150 determines a trigger condition for handing-over the delivery of the services from the radio interface of the source radio base station 210 to a radio interface of a target radio base station 220. The trigger condition for handing-over may be met if the roaming UE 200 leaves the radio coverage area of the source radio base station 210, so if the radio signal strength of the UE 200 is fading. The radio signal strength may be determined with the help of the radio interface unit 1140 for example by taking own measurements, or by measurements reported from a UE 200.

The radio base station 210, 220 may further comprise a NFVI 1160. The NFVI 1160 is adapted to host VNFs such as VNFs for offering of services to a roaming UE 200. The NFVI 1160 comprises hardware resources, which are abstracted by a Virtualization Layer. VNFs received from a VNF manager 230 may be deployed on the NFVI 1160.

According to another embodiment, a computer program is provided. The computer program may be executed by the processing units 1000 and/or 1100 of the above mentioned entities 210, 220 and/or 230 respectively such that a method for provisioning of services to a roaming UE as described above with reference to FIGS. 6 to 9 may be carried out or be controlled. In particular, the entities 210, 220 and/or 230 respectively may be caused to operate in accordance with the above described method by executing the computer program.

The computer program may be embodied as computer code, for example of a computer program product. The computer program product may be stored on a computer readable medium, for example a disk or the storing unit 1030 and/or 1130 of the entities 210, 220 and/or 230 respectively, or may be configured as downloadable information.

One or more embodiments as described above may enable at least one of the following technical effects: (1) Continuously provisioning of services to a UE while roaming; (2) reduce service latency and network transmission bandwidth due to processing close to the UE location; (3) selectively exclude VNFs from being handed-over, deliver the related services to the UE via the radio interface of the target base station; (4) flexibility of VNF allocation: per subscription, per UE, or per service; and (5) improving network flexibility, so to make it possible to allocate less-important VNFs to hosts across the network that have spare resources.

Service Handover Scenarios

Service handover discussed herein includes connection termination and reestablishment, and have two basic scenarios: make-before-break and break-before-make.

In a make-before-break scenario, a new connection is established before an existing one is taken away, so that for a short period of time the existing and new connections co-exist. This allows for a smooth handover as there is at least one connection during the handover, thus there is no interruption. If the establishment of the new connection fails, a fallback to the existing one is easy as the existing connection has not been removed yet. In the roaming UE case though, if the handover fails, the existing connection would be removed after a period of time when the radio strength of the source radio base station fades due to the movement of the UE. Because the co-existence of the new and existing connections, the resource usage in make-before-break is higher than the break-before-make.

In a break-before-make scenario, the existing connection is broken first and then the new connection is established. This scenario is referred to as hard handover sometimes as the connection is broken for a short period of time. If the establishment of the new connection fails, the connectivity is lost immediately. The resource usage in break-before-make is lower, but in order to keep the interruption small, the "make" process needs to be quick. In the roaming UE case, the break-before-make scenario is applicable when it is impractical to have both radio links at the source and target radio base stations active at the same time (as it would require dual transceivers or at least a very fast re-tuning between sending and receiving slots and different frequencies or even different radio technologies), or when the loss of data due to interruption can be compensated by fast re-transmission or repair mechanism of an upper transport layer.

The handing-over of service provisioning from a source radio base station to a target radio base station includes two aspects: 1) change of radio connection between the UE and the source radio base station toward between the UE and the target radio base station; and 2) move of one or services offered by the VNFs from the source radio base station to the target radio base station. The make-before-break and break-before-make scenarios apply to both aspects, i.e., both the radio handover and the service transfer can use either make-before-break or break-before-make method. Yet, for handing-over of service provisioning, only two out of the four possible permutations are sensible with the goal of minimizing service interruption time. FIG. 12 illustrates two scenarios of radio handover and service transfer scenario according to embodiments of the invention.

In the first scenario, the radio connection between the UE and the source radio base station remains intact while the radio connection between the UE and the target radio base station is established. After the radio connection is handed over, the service provisioning function of a set of services is then transferred (e.g., through a VNF transfer or VNF rebuild) to the target radio base station. In this scenario, the interruption of service provisioning is minimum, and the VNF on the source radio base station continues to offer the service, with the parallel connections of the UE to the source and target radio base station.

In the second scenario, the radio connection between the UE and the source radio base station is broken first before the radio connection between the UE and the destination radio base station is established. Yet, the service provisioning function of a set of services has been transferred to the target radio base station. The break of radio connection may cause interruption of service provisioning thus the second scenario is applicable to service provisioning that some interruption is acceptable.

The VNF manager coordinating the handover determines which scenario to apply in one embodiment. The determination may be based on a variety of parameters such as (1) the service provisioned to the UE—whether an interruption of service provisioning would be acceptable; (2) the subscription type of the subscriber—whether the subscriber is a premium user, a regular user, or a user of other privilege level; (3) the subscription profile of the subscriber—whether the subscriber is a consumer or an enterprise; (4) the availability of one or more network transmission links needed for the handover; (5) the (guaranteed or best effort based) bandwidth possible to be reserved on the one or more network transmission links; and (6) the resource availability on the source or target radio base station—whether there are enough processing resources, memory, database space to accommodate the moving and rebuilding of the VNFs. The determination may be different for different VNFs providing services to the same UE.

Provisioning Services for a Roaming UE Using a SDN Controller

In one embodiment, one or both of the source and target radio base stations are implemented as a network device in a software defined networking (SDN) system. The details of the network device in a SDN system are described in relation to FIGS. 18A-F. The SDN system contains one or more SDN controller (also referred to as a network controller and the two terms are used interchangeably herein). A SDN controller manages the network devices in the SDN system and it contains topology information of the SDN system, thus the SDN controller may be utilized to provide information about the network transmission links such as the bandwidth availability on the network transmission links and the resource availability on the source or target radio base station when the source or target radio base station is a network device of the SDN system.

Figure 13:
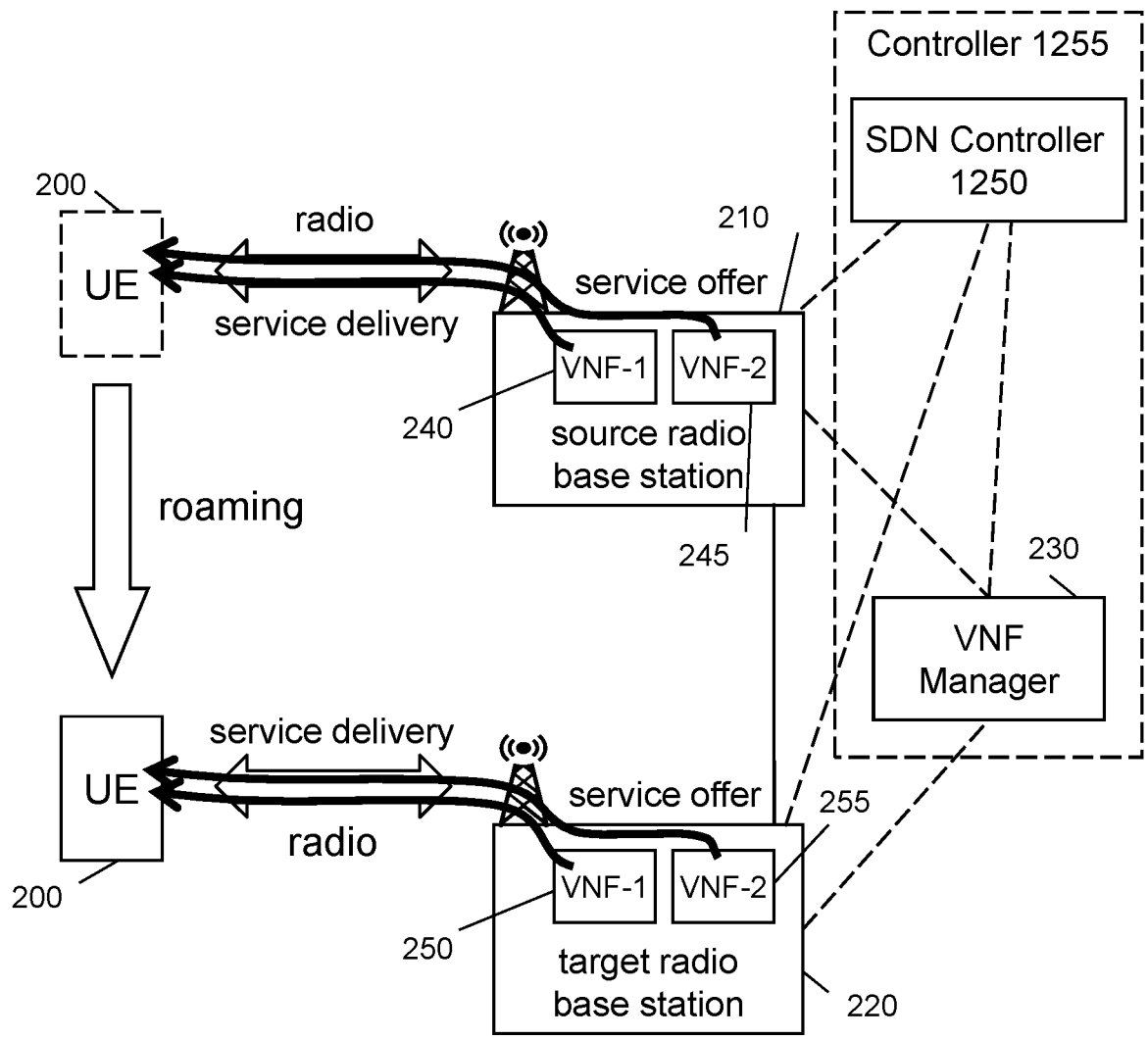
FIG. 13 illustrates a network system for provisioning of services to a roaming UE using a SDN controller according to one embodiment of the invention.

FIG. 13 illustrates a network system for provisioning of services to a roaming UE using a SDN controller according to one embodiment of the invention. FIG. 13 is similar to FIG. 2 thus only the difference between the two figures are discussed. With regard to FIG. 13, a SDN controller 1250 communicates with the VNF manager 230, and it may communicate with one or both of the source radio base station 210 and target radio base station 220, when the one or both of the radio base stations are network devices of the SDN system managed by the SDN controller 1250.

The VNF manager 230 coordinates the handover of service off from VNF-1 and VNF-2 at 240 and 245 to VNF-1 and VNF-2 at 250 and 255. During the handover, the VNF manager 230 gets information for the handover from the SDN controller 1250 in one embodiment. For example, the SDN controller 1250 may provide information about the available network transmission links and their available bandwidths, and the SDN controller 1250 may also provide information about the resource availability of a radio base station when it is implemented is a network device of the corresponding SDN system. In one embodiment, the UE 200 is also a network device of the corresponding SDN system, and the SDN controller 1250 may further provide information about the service provisioned to the UE, the subscription type and profile of the subscriber, and other information specific to the UE. With the information, the VNF manager 230 may determine which of the scenarios discussed above to use for different VNFs.

In one embodiment, the VNF manager 230 and the SDN controller is integrated in one electronic device, which is illustrated as the controller 1255, where the functionality of the VNF manager 230 and the SDN controller 1250 are integrated. While the integrated electronic device may also be called either VNF manager or SDN controller, their functionalities include the ones of both the VNF manager and the SDN controller discussed herein.

Figure 14:
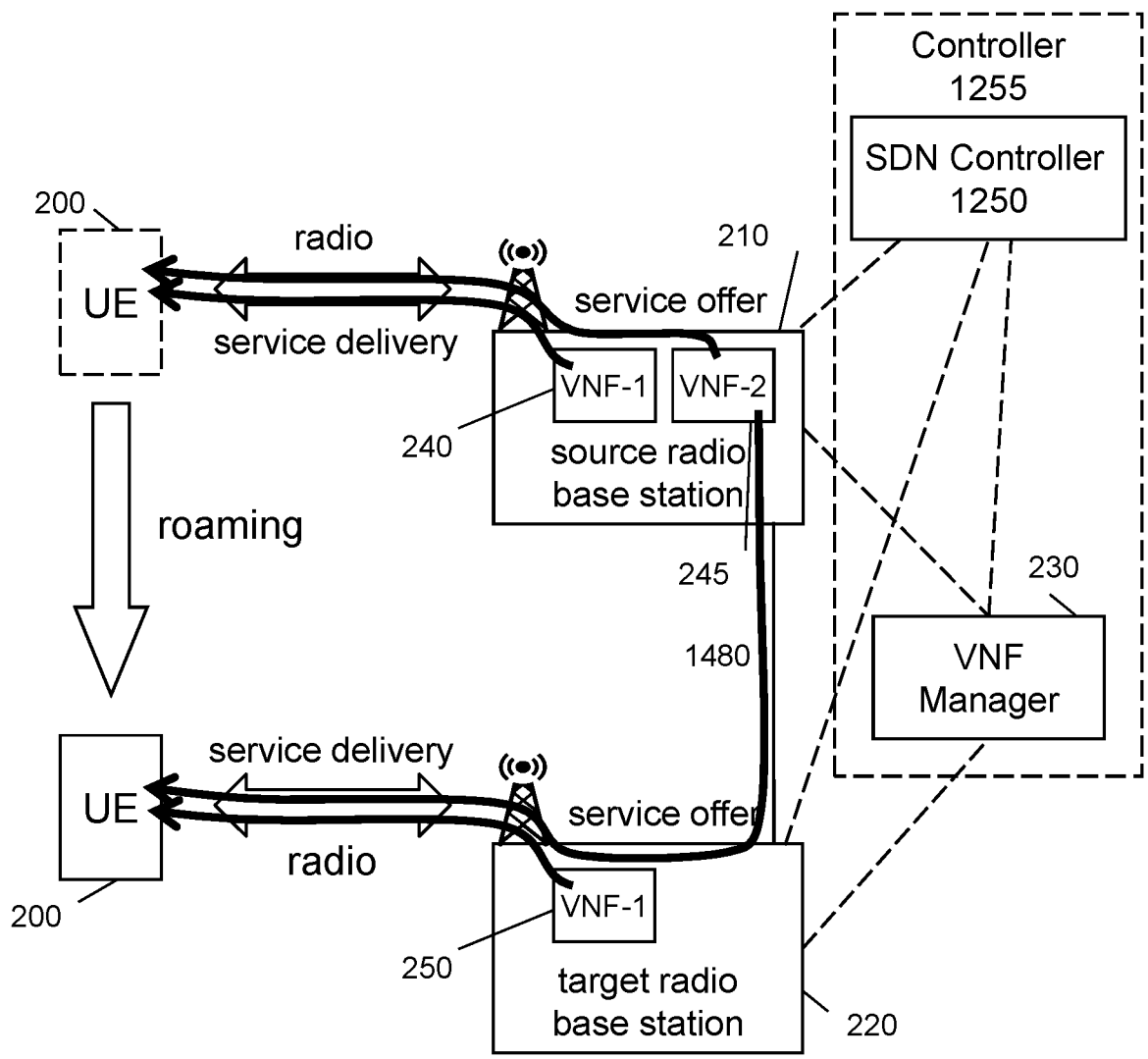
FIG. 14 illustrates a network system for provisioning of services to a roaming UE using a SDN controller according to another embodiment of the invention.

FIG. 14 illustrates a network system for provisioning of services to a roaming UE using a SDN controller according to another embodiment of the invention. FIG. 14 is similar to FIG. 3 thus only the difference between the two figures are discussed. With regard to FIG. 14, a SDN controller 1250 communicates with the VNF manager 230, and it may communicate with one or both of the source radio base station 210 and target radio base station 220, when the one or both of the radio base stations are network devices of the SDN system managed by the SDN controller 1250.

In FIG. 14, the network interface 1480 may be a channel utilizing one or more network transmission links such as a direct land-based connection or microwave radio based transmission links between the two radio base stations 210 and 220. Radio base stations are typically hooked up to a backhaul network connecting them to the core network. Thus such network interface 1480 between two radio base stations may also be realized by routing/switching via backhaul network connections or even by routing/switching via a core network node. The network interface 1480 may be based on routed packets connections or pre-established packet tunnels using well-known layer 2 or layer 3 tunnel mechanisms. The selection of such channel is based on the topology information received from the SDN controller 1250. Additionally, the realization by routing/switching, the routed packet connections, or the pre-established packet tunnels, is also performed based on information received from the SDN controller 1250. Furthermore, the determination of which of the subset of the services is to be handed over to the target radio base station 220 is based on a variety of factors, including the latency requirements of the services, the available network transmission links and their available bandwidths, and these information may be retrieved from the SDN controller 1250. In other words, the VNF manager 230 may rely on the SDN controller 1250 for information about the handover. Similar to FIG. 13, an integrated electronic device that is illustrated as the controller 1255.

Figure 15:
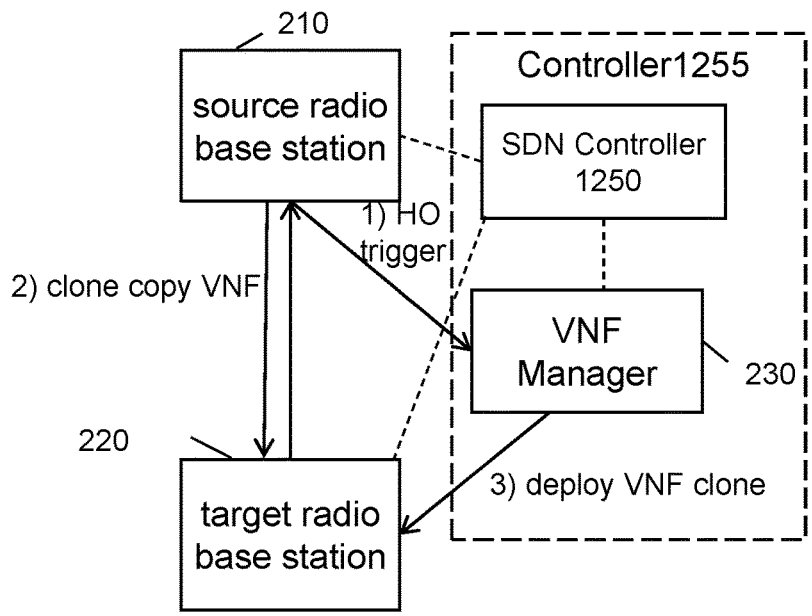
FIG. 15 illustrates a network system for deploying a VNF on a target radio base station using a SDN controller according to one embodiment of the invention.

FIG. 15 illustrates a network system for deploying a VNF on a target radio base station using a SDN controller according to one embodiment of the invention. FIG. 15 is similar to FIG. 4 thus only the difference between the two figures are discussed. With regard to FIG. 15, a SDN controller 1250 communicates with the VNF manager 230, and it may communicate with one or both of the source radio base station 210 and target radio base station 220, when the one or both of the radio base stations are network devices of the SDN system managed by the SDN controller 1250. The VNF manager 230 performs the cloning of the VNF, and the VNF manager 230 may request one or more VNF at one time, depending on the available network transmission links and their available bandwidths obtained from the SDN controller 1250. Similar to FIG. 13, an integrated electronic device that is illustrated as the controller 1255.

Figure 16:
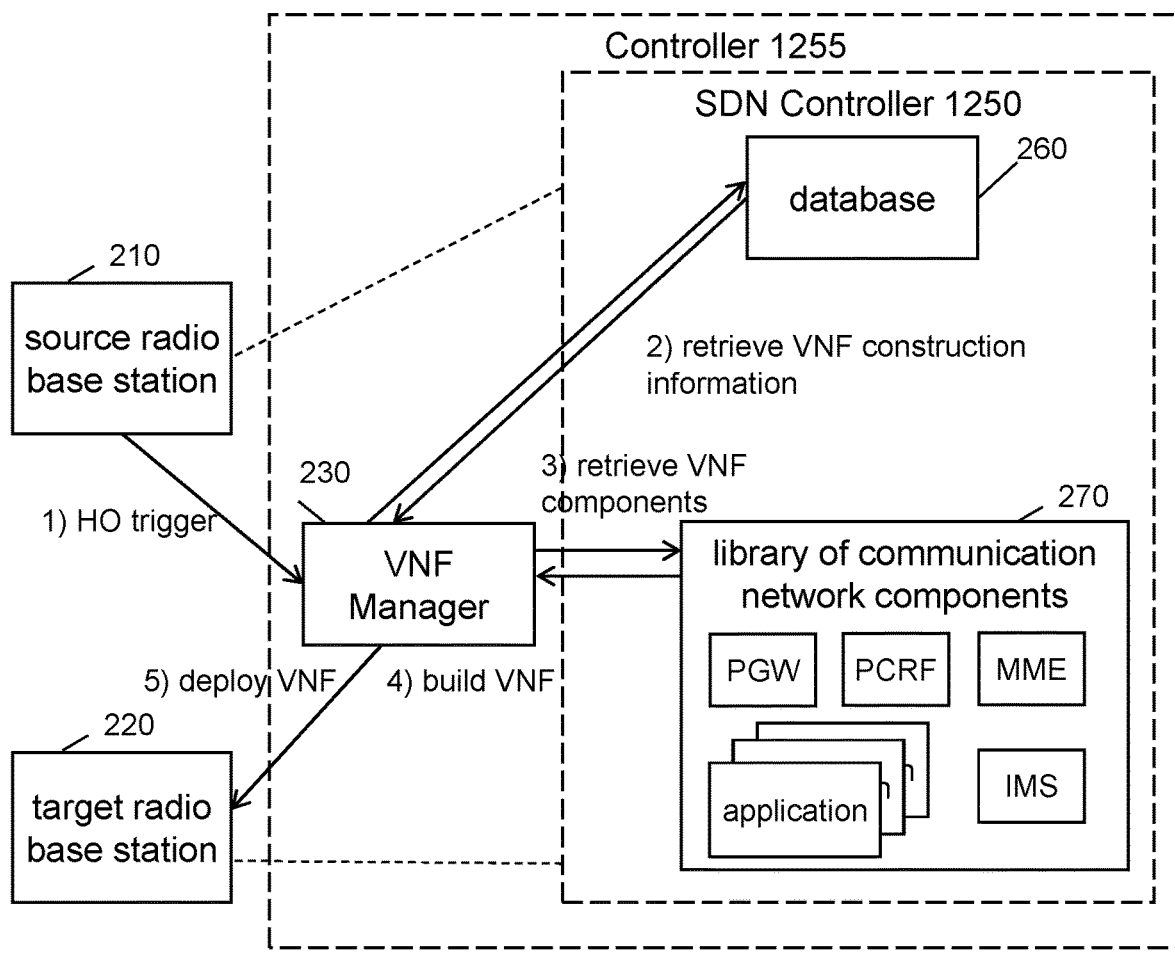
FIG. 16 illustrates a network system for deploying a VNF on a target radio base station using a SDN controller according to another embodiment of the invention.

FIG. 16 illustrates a network system for deploying a VNF on a target radio base station using a SDN controller according to another embodiment of the invention. FIG. 16 is similar to FIG. 5 thus only the difference between the two figures are discussed. With regard to FIG. 16, a SDN controller 1250 communicates with the VNF manager 230, and it may communicate with one or both of the source radio base station 210 and target radio base station 220, when the one or both of the radio base stations are network devices of the SDN system managed by the SDN controller 1250. The database 260 and the library of communication network components 270 are the same or similar to the ones in FIG. 5. However, one or both of the database 260 and the library of communication network components 270 may be in the SDN controller 1250 in one embodiment. Similar to FIG. 13, an integrated electronic device that is illustrated as the controller 1255.

Flow Diagram for a VNF Manager Managing Service Delivery Using SDN Controller

Figure 17:
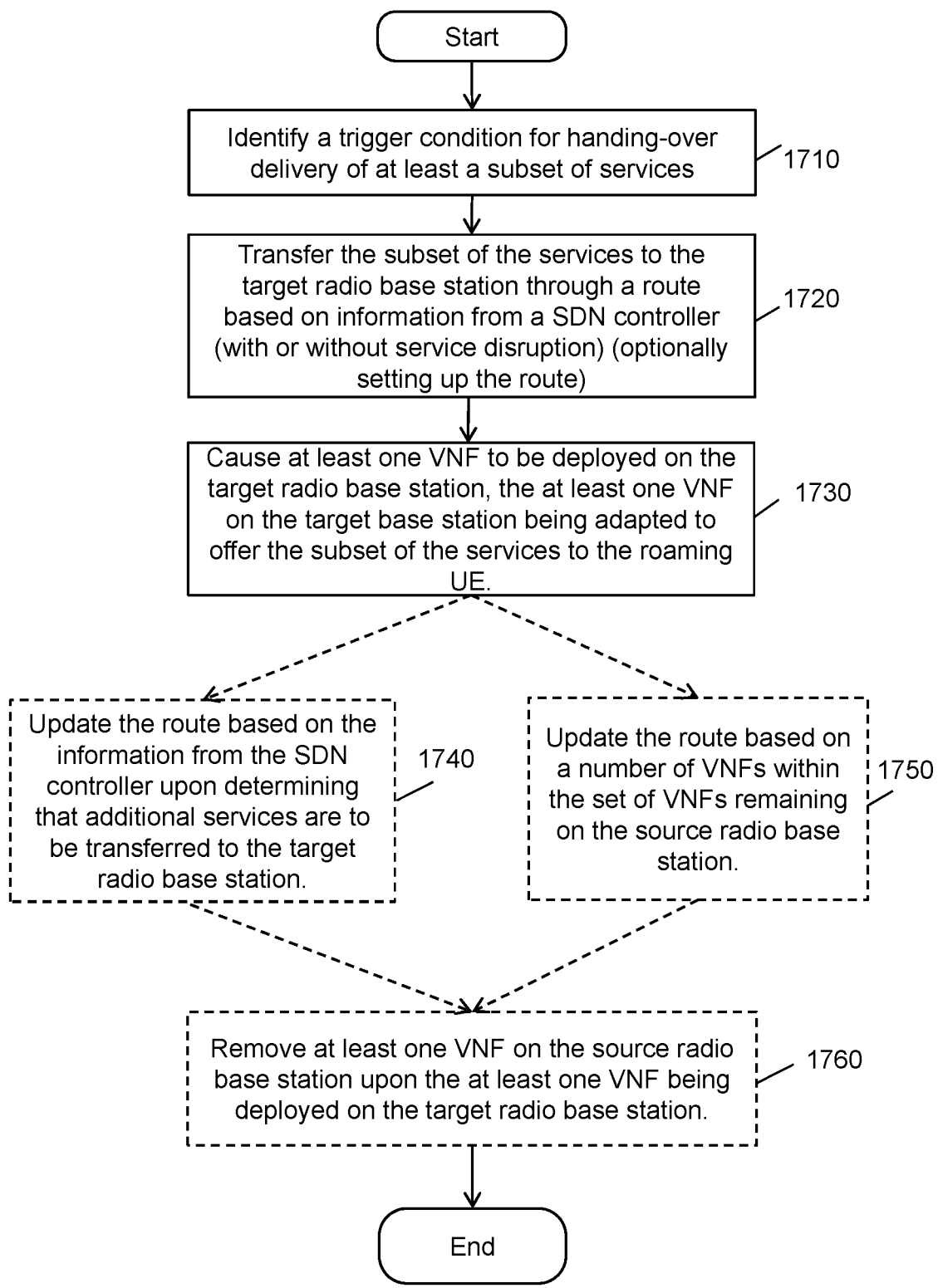
FIG. 17 is a flow diagram illustrating a method of a VNF manager managing service delivery using a SDN controller according to one embodiment of the invention.

FIG. 17 is a flow diagram illustrating a method of a VNF manager managing service delivery using a SDN controller according to one embodiment of the invention. The VNF manager may be the VNF manager 230 or the controller 1255 discussed herein above, and the SDN controller may be the SDN controller 1250 or the controller 1255. The VNF manager manages delivery of services to roaming UEs such as UE 200, which roams from a radio coverage area of a source radio base station into a radio coverage area of a target radio base station. The SDN controller manages a SDN system that includes at least one of the source base station and the target radio base station as a network device of the SDN system.

At reference 1702, the VNF manager such as VNF manager 230 identifies a trigger condition for handing-over delivery of at least a subset of the services from a radio interface of a source radio base station such as the source radio base station 210 to a radio interface of a target radio base station such as the target radio base station 220.

The trigger condition may be an indication received from the source radio base station or the SDN controller that the radio signal strength of the radio interface of the source radio base station is fading for a UE. The SDN controller may provide such indication when the source radio base station or the UE is implemented as a network device of the corresponding SDN system. The indication may specify the subset of the services to be handed over. The subset of the services may be selected based on factors such as the latency requirement of the services (the more sensitive a service to delay, the more likely the service needs to be handed over), the bandwidth requirement of handing over the associated VNF (the more bandwidth required, the less likely the VNF will be handed over), the available bandwidth on network transmission links (the more bandwidth being available, more VNFs/services are handed over).

At reference 1720, the VNF transfers the subset of the services to the target radio base station through a route based on information from the SDN controller. The information may include the topology information of the SDN system (including at least one of the source and target radio base stations) such as the available network transmission links and their available bandwidths.

The transfer of the subset of the services may be through cloning the VNF(s) that delivers the subset of the services from the source radio base station as discussed herein above in relation to FIGS. 2, 4, 6, 10, 13, and 15. The cloned copy of the VNF(s) may be sent from the source radio base station to the VNF manager and then from the VNF manager to the target radio base station; and the cloned copy of the VNF(s) may also be sent from the source radio base station directly to the target radio base station. The route selection may differ accordingly in these two approaches, and the information required to make the routing selection is retrieved from the SDN controller in one embodiment.

The transfer of the subset of the services may also be through rebuilding the VNF(s) that delivers the subset of the services at the target radio base station as discussed herein above in relation to FIGS. 2, 5, 6, 10, and 16. The building of the VNF(s) at the target radio base station is based on information from the SDN controller in one embodiment, the information including ones in the database 260 and/or the library of communication network components 270. The route selection in the building approach typically requires different amount of bandwidths from connection to the source radio base station as the clone copy is not required to be obtained from the source radio base station. On the other hand, since the building of the VNF at the target radio base station is based on communication between the VNF manager and the target radio base station, the bandwidth requirement between the two is likely more.

The route selection in both cloning and the building the VNF(s) is based on information in the SDN controller in one embodiment. Additionally, in one embodiment, the VNF manager causes the SDN controller to set up the route for cloning or building the VNF(s). In the cloning approach, the SDN controller sets up the route between the source radio base station and the target radio base station in one embodiment. In the rebuilding approach, the SDN controller sets up a route between the VNF manager and the target radio base station. The setting up the route includes the SDN controller causes flow table entries being installed in a network device (such as the source or target radio base station), so that packets belongs to a traffic flow (e.g. the traffic flow containing the clone copy of the VNF(s) or the information regarding rebuilding of the VNF(s)) is to be routed as the SDN controller instructs. In the service rebuilding approach, the VNF causes the SDN controller to set up the route for the target radio base station to obtain construction information on the subset of the services to deploy the at least VNF on the target radio base station, and the construction information being retrieved from a database.

It is to be noted that the VNF manager determines which scenario discussed in relation to FIG. 12 to apply for the subset of the services at step 1720. Based on the information obtained from the SDN controller, the VNF manager may determine all of the subset of the services utilize the first or second scenario; alternatively, the VNF manager may determine the utilization of the first or second scenario on service basis because different services have different latency and/or bandwidth requirement.

The selection of the scenario affects which route to be set up by the SDN controller. For example, if one or all of the subset of the services to be transferred takes the break-before-make approach (the second scenario), the SDN controller will select a route based on an acceptable interruption time for the one or the whole subset of the services. The selected route may contain more network transmission links and/or the selected links may have more available bandwidths to accommodate the one or the whole subset of the services (either through cloning or the rebuilding of the VNF(s)) so that the interruption time for the one or the whole subset of the services does not get over the acceptable interruption time.

The selection of the scenario also affects the sequence of operations in the service transfer. In one embodiment, when the first scenario is selected, the VNF manager instructs the target radio base station to prepare the target radio sources. The VNF manager then instructs the source radio base station to inform the UE to hand over to the target radio base station. Afterward, the VNF manager instructs the VNF on the source radio base station to multicast the service delivery (1) over radio connection of the source radio base station to the UE, and (2) over network transmission link(s) to the target radio base station for service delivery. Thus, the service delivering is duplicated at both the source and target radio base stations during the transfer step 1720, and the subset of the services is offered continuously by the source radio base station prior to the subset of the services being offered by the target radio base station.

In one embodiment, when the second scenario is selected, the VNF manager also instructs the target radio base station to prepare the target radio sources. The VNF manager then transfers the subset of the services to the target radio base station. Additionally, the VNF manager instructs the source radio base station to inform the UE to hand over to the target radio base station, and it causes removal of the source radio connection to the UE. Thus, the service delivering is interrupted at the transfer step 1720 in this embodiment.

At reference 1730, the VNF manager causes at least one VNF to be deployed at the target radio base station, and the at least one VNF on the target radio base station being adapted to offer the subset of the services to the roaming UE. As discussed herein, the at least one VNF may be deployed through either cloning or rebuilding. After the VNF is cloned or rebuilt at the target radio base station, the target radio base station initializes and stars up the VNFs to offer the subset of the services to the roaming UE.

Additionally, in one embodiment, the VNF manager determines that one or more additional services are to be transferred to the target radio base station at reference 1740, and the determination causes the route being updated. The determination may be based on the roaming status of the UE, e.g., the UE is moving further away and causes more services to be transfer to the target radio base station. The updated route may be on the same network transmission links but with different bandwidths being utilized, and the updated route may be on different network/transmission links.

Furthermore, in one embodiment, the VNF manager updates the route based on a number of VNFs within the set of VNFs remaining on the source radio base station at reference 1750. At reference 1710, the trigger condition may be for a subset of the services offered by the set of VNFs hosted on the source radio base station. Thus, some of the services (which provided by VNFs) may stay at the source radio base station after the operations at references 1720 and 1730. When there are services and the associated VNFs stay at the source radio base station for the UE, the route may be updated for the VNFs to deliver services to the UE. The reason is that the route used at reference 1720 is for transferring the subset of the services thus the bandwidth may be different from (likely higher than) the ones required for the continuing delivery of service through the source radio base station and the target radio base station as illustrated in FIGS. 3 and 14. The operation of the remaining services is discussed in more details in relation to step 750 of FIG. 7.

In one embodiment, at reference 1760, the VNF manager causes the removal of the at least one VNF on the source radio base station upon the at least one VNF being deployed on the target radio base station. The VNF manager instructs the source radio base station to delete the moved VNF once that VNF (being cloned to or being rebuilt at the target radio base station) is deployed.

It is to be noted that while the references 1740-1760 are illustrated in one order in FIG. 17. The illustration is only an embodiment of the invention and the order may be different in another embodiment. For example, the removal of a VNF after it is deployed on the target radio base station may happen first. Afterward, the route is updated based on the number of VNFs within the set of VNFs remains on the source radio base station (e.g., reducing the bandwidth for the route as less VNFs remain on the source radio base station); in alternative, the route may be updated to transfer additional services (thus deploying additional VNFs) to the target radio base station (e.g., increasing the bandwidth for the route if the additional bandwidth becomes available to reduce the time to complete the transfer). Other operation sequences may be implemented within the principles disclosed herein.

SDN and NFV Environment Utilizing Embodiments of the Invention

Figure 18A:
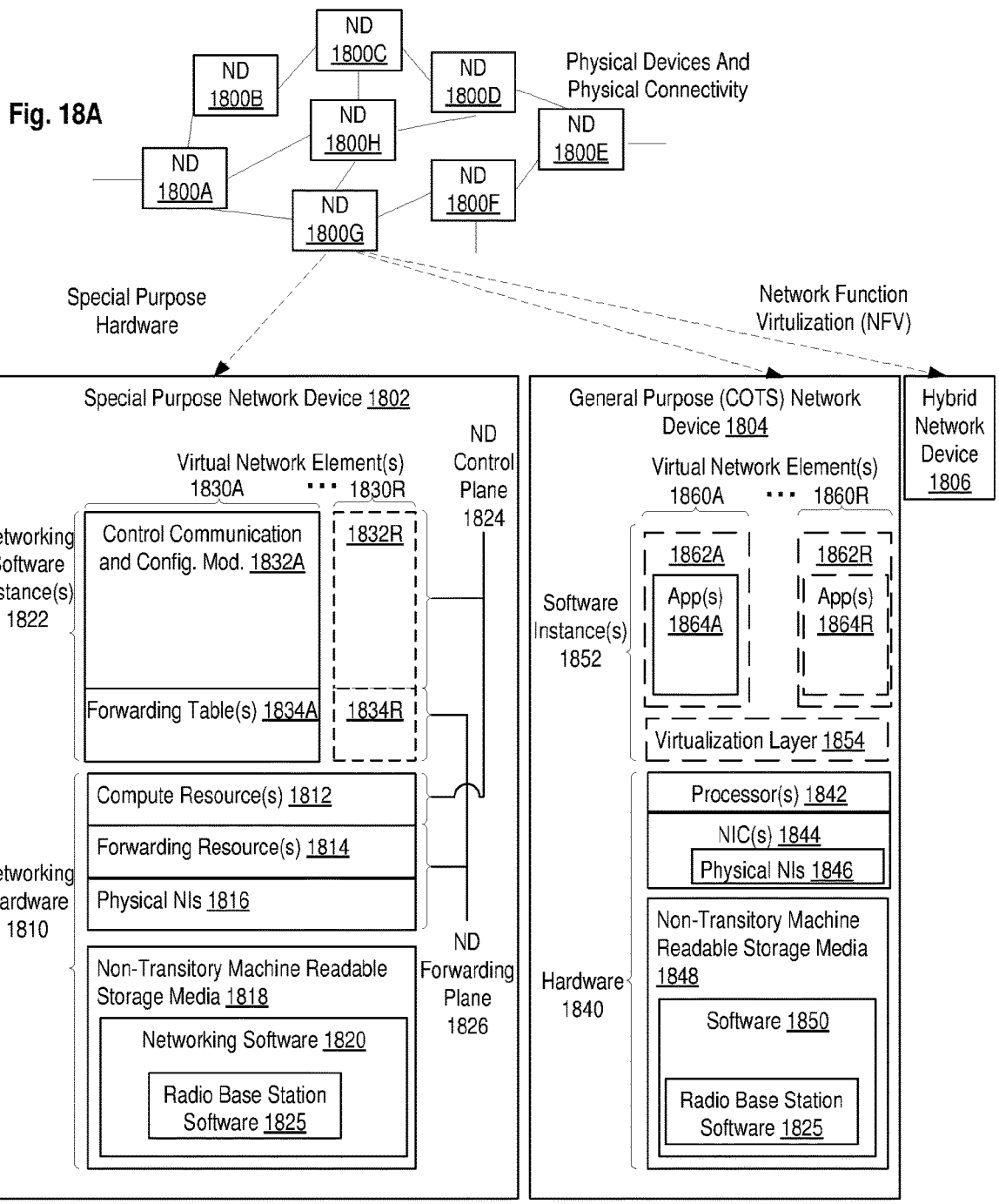
FIG. 18A illustrates connectivity between network devices (NDs) within an exemplary network, as well as three exemplary implementations of the NDs, according to some embodiments of the invention.

Embodiments of the invention may be utilized in a SDN and NFV network containing network devices. FIG. 18A illustrates connectivity between network devices (NDs) within an exemplary network, as well as three exemplary implementations of the NDs, according to some embodiments of the invention. FIG. 18A shows NDs 1800A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 1800A, E, and F illustrates that these NDs act as ingress and egress points for the network (and thus, these NDs are sometimes referred to as edge NDs; while the other NDs may be called core NDs).

Two of the exemplary ND implementations in FIG. 18A are: 1) a special purpose network device 1802 that uses custom application—specific integrated—circuits (ASICs) and a proprietary operating system (OS); and 2) a general purpose network device 1804 that uses common off-the-shelf (COTS) processors and a standard OS.

The special purpose network device 1802 includes networking hardware 1810 comprising compute resource(s) 1812 (which typically include a set of one or more processors), forwarding resource(s) 1814 (which typically include one or more ASICs and/or network processors), and physical network interfaces (NIs) 1816 (sometimes called physical ports), as well as non-transitory machine readable storage media 1818 having stored therein networking software 1820, including radio base station software 1825. The radio base station software 1825 contains software modules to perform operations of the source or target radio base stations discussed herein above. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 1800A-H. During operation, the radio base station software 1825 may be executed by the networking hardware 1810 to instantiate a radio base station software instance, which perform operations of a source or target radio base station as discussed herein above. The radio base station software instance and that part of the networking hardware 1810 that executes that instance (be it hardware dedicated to that networking software instance and/or time slices of hardware temporally shared by that networking software instance with others of the networking software instance 1822), form a separate virtual network element 1830A-R. Each of the virtual network element(s) (VNEs) 1830A-R includes a control communication and configuration module 1832A-R (sometimes referred to as a local control module or control communication module) and forwarding table(s) 1834A-R, such that a given virtual network element (e.g., 1830A) includes the control communication and configuration module (e.g., 1832A), a set of one or more forwarding table(s) (e.g., 1834A), and that portion of the networking hardware 1810 that executes the virtual network element (e.g., 1830A).

The special purpose network device 1802 is often physically and/or logically considered to include: 1) a ND control plane 1824 (sometimes referred to as a control plane) comprising the compute resource(s) 1812 that execute the control communication and configuration module(s) 1832A-R; and 2) a ND forwarding plane 1826 (sometimes referred to as a forwarding plane, a data plane, or a media plane) comprising the forwarding resource(s) 1814 that utilize the forwarding table(s) 1834A-R and the physical NIs 1816. By way of example, where the ND is a router (or is implementing routing functionality), the ND control plane 1824 (the compute resource(s) 1812 executing the control communication and configuration module(s) 1832A-R) is typically responsible for participating in controlling how data (e.g., packets) is to be routed (e.g., the next hop for the data and the outgoing physical NI for that data) and storing that routing information in the forwarding table(s) 1834A-R, and the ND forwarding plane 1826 is responsible for receiving that data on the physical NIs 1816 and forwarding that data out the appropriate ones of the physical NIs 1816 based on the forwarding table(s) 1834A-R.

Figure 18B:
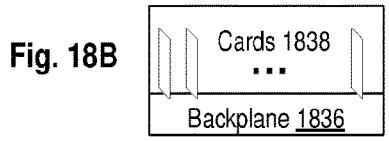
FIG. 18B illustrates an exemplary way to implement a special purpose network device according to some embodiments of the invention.

FIG. 18B illustrates an exemplary way to implement a special purpose network device according to some embodiments of the invention. FIG. 18B shows the special purpose network device including cards 1838 (typically hot pluggable). While in some embodiments the cards 1838 are of two types (one or more that operate as the ND forwarding plane 1826 (sometimes called line cards), and one or more that operate to implement the ND control plane 1824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1836 (e.g., a first full mesh coupling the line cards and a second full mesh coupling all of the cards).

Returning to FIG. 18A, the general purpose network device 1804 includes hardware 1840 comprising a set of one or more processor(s) 1842 (which are often COTS processors) and network interface controller(s) 1844 (NICs; also known as network interface cards) (which include physical NIs 1846), as well as non-transitory machine readable storage media 1848 having stored therein software 1850, which may also contain the radio base station software 1825. During operation, the processor(s) 1842 execute the software 1850 to instantiate one or more sets of one or more applications 1864A-R. While one embodiment does not implement virtualization, alternative embodiments may use different forms of virtualization. For example, in one such alternative embodiment the virtualization layer 1854 represents the kernel of an operating system (or a shim executing on a base operating system) that allows for the creation of multiple instances 1862A-R called software containers that may each be used to execute one (or more) of the sets of applications 1864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1854 represents a hypervisor (sometimes referred to as a virtual machine monitor (VMM)) or a hypervisor executing on top of a host operating system, and each of the sets of applications 1864A-R is run on top of a guest operating system within an instance 1862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1840, directly on a hypervisor (in which case the unikernel is sometimes described as running within a LibOS virtual machine), or in a software container, embodiments can be implemented fully with unikernels running directly on a hypervisor represented by virtualization layer 1854, unikernels running within software containers represented by instances 1862A-R, or as a combination of unikernels and the above-described techniques (e.g., unikernels and virtual machines both run directly on a hypervisor, unikernels and sets of applications that are run in different software containers).

The instantiation of the one or more sets of one or more applications 1864A-R, as well as virtualization if implemented, are collectively referred to as software instance(s) 1852. Each set of applications 1864A-R, corresponding virtualization construct (e.g., instance 1862A-R) if implemented, and that part of the hardware 1840 that executes them (be it hardware dedicated to that execution and/or time slices of hardware temporally shared), forms a separate virtual network element(s) 1860A-R.

The virtual network element(s) 1860A-R perform similar functionality to the virtual network element(s) 1830A-R— e.g., similar to the control communication and configuration module(s) 1832A and forwarding table(s) 1834A (this virtualization of the hardware 1840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1862A-R corresponding to one VNE 1860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1862A-R to VNEs also apply to embodiments where such a finer level of granularity and/or unikernels are used.

In certain embodiments, the virtualization layer 1854 includes a virtual switch that provides similar forwarding services as a physical Ethernet switch. Specifically, this virtual switch forwards traffic between software containers 1862A-R and the NIC(s) 1844, as well as optionally between the software containers 1862A-R; in addition, this virtual switch may enforce network isolation between the VNEs 1860A-R that by policy are not permitted to communicate with each other (e.g., by honoring virtual local area networks (VLANs)).

The third exemplary ND implementation in FIG. 18A is a hybrid network device 1806, which includes both custom ASICs/proprietary OS and COTS processors/standard OS in a single ND or a single card within an ND. In certain embodiments of such a hybrid network device, a platform VM (i.e., a VM that that implements the functionality of the special purpose network device 1802) could provide for para-virtualization to the networking hardware present in the hybrid network device 1806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1830A-R, VNEs 1860A-R, and those in the hybrid network device 1806) receives data on the physical NIs (e.g., 1816, 1846) and forwards that data out the appropriate ones of the physical NIs (e.g., 1816, 1846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 18C:
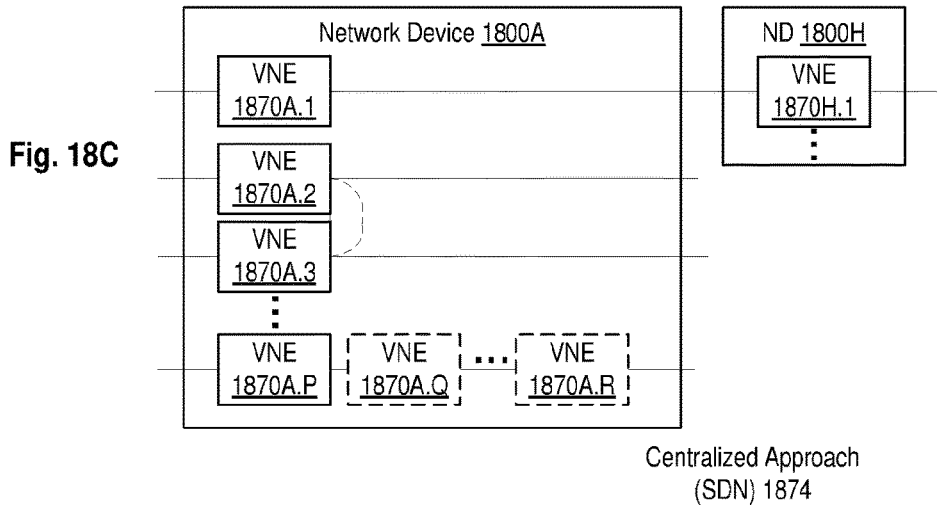
FIG. 18C illustrates various exemplary ways in which virtual network elements (VNEs) may be coupled according to some embodiments of the invention.

FIG. 18C illustrates various exemplary ways in which VNEs may be coupled according to some embodiments of the invention. FIG. 18C shows VNEs 1870A.1-1870A.P (and optionally VNEs 1870A.Q-1870A.R) implemented in ND 1800A and VNE 1870H.1 in ND 1800H. In FIG. 18C, VNEs 1870A.1-P are separate from each other in the sense that they can receive packets from outside ND 1800A and forward packets outside of ND 1800A; VNE 1870A.1 is coupled with VNE 1870H.1, and thus they communicate packets between their respective NDs; VNE 1870A.2-1870A.3 may optionally forward packets between themselves without forwarding them outside of the ND 1800A; and VNE 1870A.P may optionally be the first in a chain of VNEs that includes VNE 1870A.Q followed by VNE 1870A.R (this is sometimes referred to as dynamic service chaining, where each of the VNEs in the series of VNEs provides a different service—e.g., one or more layer 4-7 network services). While FIG. 18C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 18A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 18A may also host one or more such servers (e.g., in the case of the general purpose network device 1804, one or more of the virtual machines 1862A-R may operate as servers; the same would be true for the hybrid network device 1806; in the case of the special purpose network device 1802, one or more such servers could also be run on a hypervisor executed by the compute resource(s) 1812); in which case the servers are said to be co-located with the VNEs of that ND.

A virtual network is a logical abstraction of a physical network (such as that in FIG. 18A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 18D:
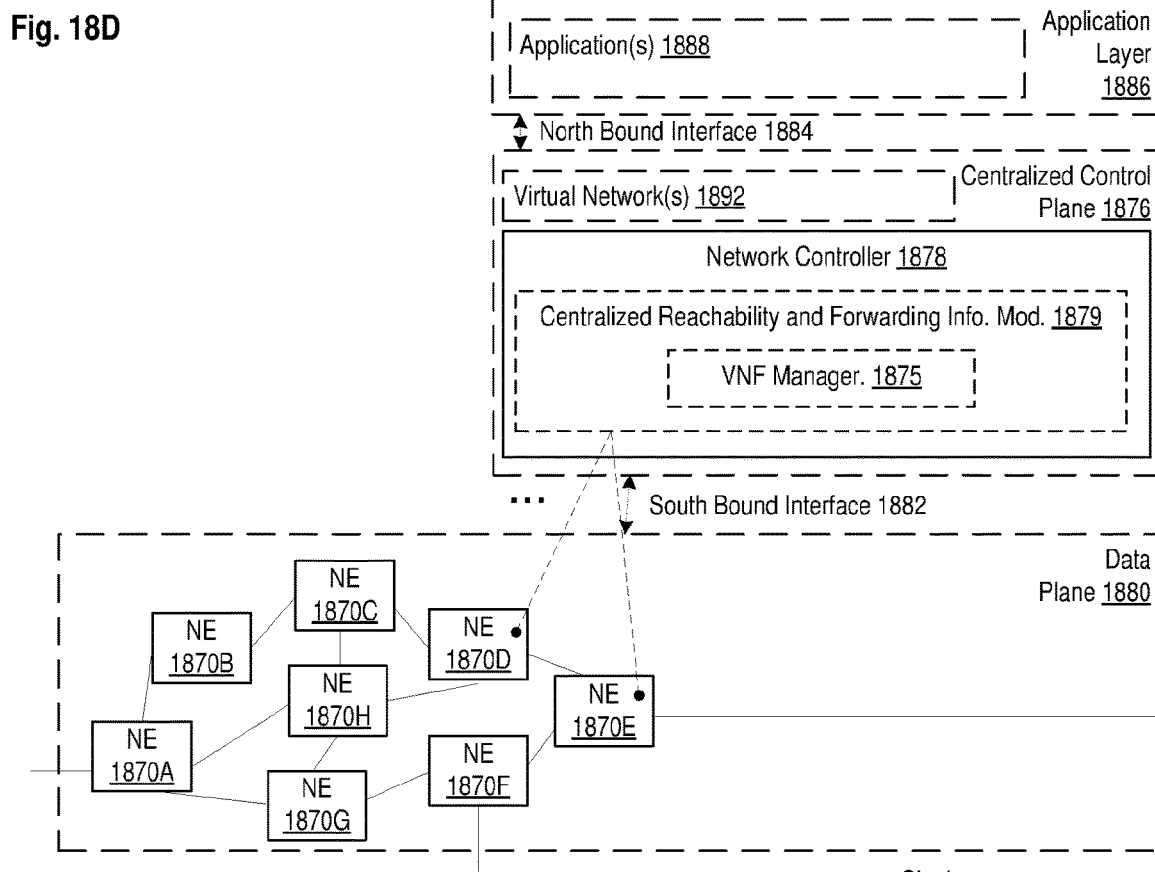
FIG. 18D illustrates a centralized approach for maintaining reachability and forwarding information (also called network control), according to some embodiments of the invention.

FIG. 18D illustrates a network with a single network element on each of the NDs of FIG. 18A. Specifically, FIG. 18D illustrates network elements (NEs) 1870A-H with the same connectivity as the NDs 1800A-H of FIG. 18A with a centralized approach for maintaining reachability and forwarding information (also called network control), according to some embodiments of the invention.

FIG. 18D illustrates that a centralized approach 1874 (also known as software defined networking (SDN)) that decouples the system that makes decisions about where traffic is sent from the underlying systems that forwards traffic to the selected destination. The illustrated centralized approach 1874 has the responsibility for the generation of reachability and forwarding information in a centralized control plane 1876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1876 has a south bound interface 1882 with a data plane 1880 (sometime referred to the infrastructure layer, network forwarding plane, or forwarding plane (which should not be confused with a ND forwarding plane)) that includes the NEs 1870A-H (sometimes referred to as switches, forwarding elements, data plane elements, or nodes). The centralized control plane 1876 includes a network controller 1878, which includes a centralized reachability and forwarding information module 1879 that determines the reachability within the network and distributes the forwarding information to the NEs 1870A-H of the data plane 1880 over the south bound interface 1882 (which may use the OpenFlow protocol). The centralized reachability and forwarding information module 1879 contains the VNF manager 1875. The VNF manager 1875 within the network controller 1878 is one embodiment of the integrated controller 1255 discussed herein above in relation to FIGS. 13-16.

The network intelligence is centralized in the centralized control plane 1876 executing on electronic devices that are typically separate from the NDs. For example, where the special purpose network device 1802 is used in the data plane 1880, each of the control communication and configuration module(s) 1832A-R of the ND control plane 1824 typically include a control agent that provides the VNE side of the south bound interface 1882. In this case, the ND control plane 1824 (the compute resource(s) 1812 executing the control communication and configuration module(s) 1832A-R) performs its responsibility for participating in controlling how data (e.g., packets) is to be routed (e.g., the next hop for the data and the outgoing physical NI for that data) through the control agent communicating with the centralized control plane 1876 to receive the forwarding information (and in some cases, the reachability information) from the centralized reachability and forwarding information module 1879 (it should be understood that in some embodiments of the invention, the control communication and configuration module(s) 1832A-R, in addition to communicating with the centralized control plane 1876, may also play some role in determining reachability and/or calculating forwarding information—albeit less so than in the case of a distributed approach; such embodiments are generally considered to fall under the centralized approach 1874, but may also be considered a hybrid approach).

While the above example uses the special purpose network device 1802, the same centralized approach 1874 can be implemented with the general purpose network device 1804 (e.g., each of the VNE 1860A-R performs its responsibility for controlling how data (e.g., packets) is to be routed (e.g., the next hop for the data and the outgoing physical NI for that data) by communicating with the centralized control plane 1876 to receive the forwarding information (and in some cases, the reachability information) from the centralized reachability and forwarding information module 1879; it should be understood that in some embodiments of the invention, the VNEs 1860A-R, in addition to communicating with the centralized control plane 1876, may also play some role in determining reachability and/or calculating forwarding information—albeit less so than in the case of a distributed approach) and the hybrid network device 1806. In fact, the use of SDN techniques can enhance the NFV techniques typically used in the general purpose network device 1804 or hybrid network device 1806 implementations as NFV is able to support SDN by providing an infrastructure upon which the SDN software can be run, and NFV and SDN both aim to make use of commodity server hardware and physical switches.

FIG. 18D also shows that the centralized control plane 1876 has a north bound interface 1884 to an application layer 1886, in which resides application(s) 1888. The centralized control plane 1876 has the ability to form virtual networks 1892 (sometimes referred to as a logical forwarding plane, network services, or overlay networks (with the NEs 1870A-H of the data plane 1880 being the underlay network)) for the application(s) 1888. Thus, the centralized control plane 1876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 18D illustrates the simple case where each of the NDs 1800A-H implements a single NE 1870A-H, it should be understood that the network control approaches described with reference to FIG. 18D also work for networks where one or more of the NDs 1800A-H implement multiple VNEs (e.g., VNEs 1830A-R, VNEs 1860A-R, those in the hybrid network device 1806). Alternatively or in addition, the network controller 1878 may also emulate the implementation of multiple VNEs in a single ND. Specifically, instead of (or in addition to) implementing multiple VNEs in a single ND, the network controller 1878 may present the implementation of a VNE/NE in a single ND as multiple VNEs in the virtual networks 1892 (all in the same one of the virtual network(s) 1892, each in different ones of the virtual network(s) 1892, or some combination). For example, the network controller 1878 may cause an ND to implement a single VNE (a NE) in the underlay network, and then logically divide up the resources of that NE within the centralized control plane 1876 to present different VNEs in the virtual network(s) 1892 (where these different VNEs in the overlay networks are sharing the resources of the single VNE/NE implementation on the ND in the underlay network).

Figure 18E:
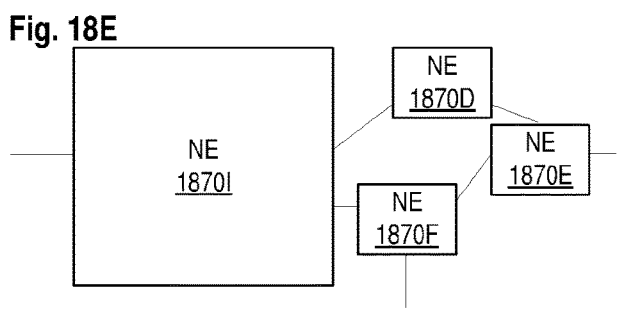
FIG. 18E illustrates the simple case of where each of the NDs implements a single NE, but a centralized control plane has abstracted multiple of the NEs in different NDs into (to represent) a single NE in one of the virtual network(s), according to some embodiments of the invention.
Figure 18F:
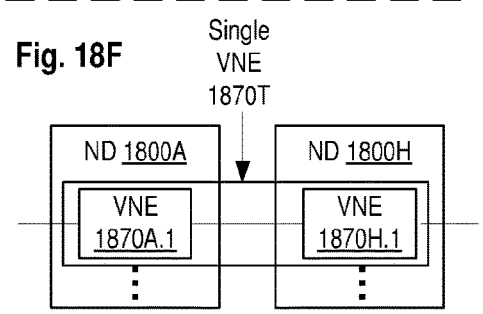
FIG. 18F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 18E and 18F respectively illustrate exemplary abstractions of NEs and VNEs that the network controller 1878 may present as part of different ones of the virtual networks 1892. FIG. 18E illustrates the simple case of where each of the NDs 1800A-H implements a single NE 1870A-H (see FIG. 18D), but the centralized control plane 1876 has abstracted multiple of the NEs in different NDs (the NEs 1870A-C and G-H) into (to represent) a single NE 18701 in one of the virtual network(s) 1892 of FIG. 18D, according to some embodiments of the invention. FIG. 18E shows that in this virtual network, the NE 18701 is coupled to NE 1870D and 1870F, which are both still coupled to NE 1870E.

FIG. 18F illustrates a case where multiple VNEs (VNE 1870A.1 and VNE 1870H.1) are implemented on different NDs (ND 1800A and ND 1800H) and are coupled to each other, and where the centralized control plane 1876 has abstracted these multiple VNEs such that they appear as a single VNE 1870T within one of the virtual networks 1892 of FIG. 18D, according to some embodiments of the invention. Thus, the abstraction of a NE or VNE can span multiple NDs.

While some embodiments of the invention implement the centralized control plane 1876 as a single entity (e.g., a single instance of software running on a single electronic device), alternative embodiments may spread the functionality across multiple entities for redundancy and/or scalability purposes (e.g., multiple instances of software running on different electronic devices).

Figure 19:
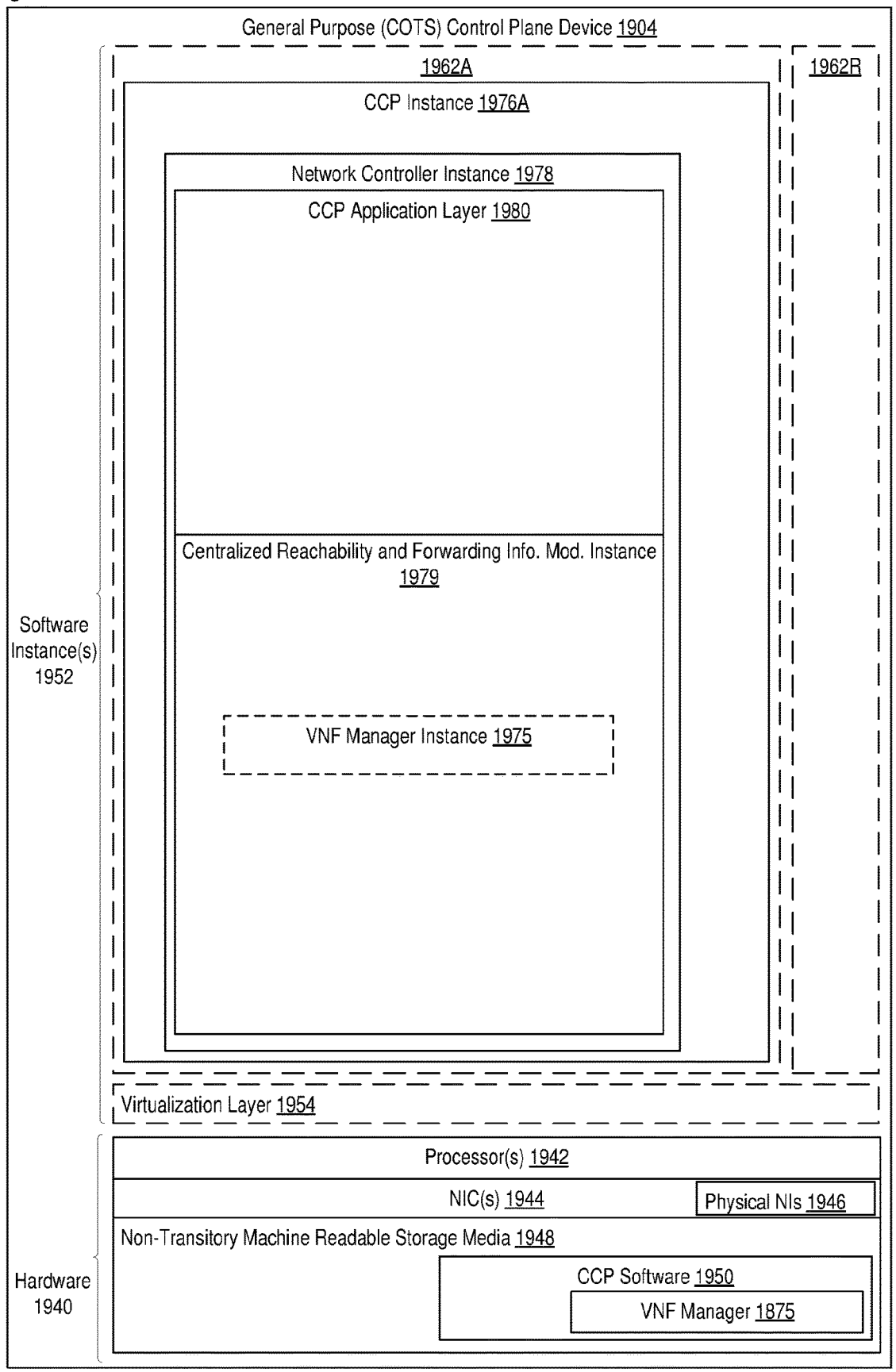
FIG. 19 illustrates a general purpose control plane device with centralized control plane (CCP) software according to some embodiments of the invention.

Similar to the network device implementations, the electronic device(s) running the centralized control plane 1876, and thus the network controller 1878 including the centralized reachability and forwarding information module 1879, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 19 illustrates, a general purpose control plane device 1904 including hardware 1940 comprising a set of one or more processor(s) 1942 (which are often COTS processors) and network interface controller(s) 1944 (NICs; also known as network interface cards) (which include physical NIs 1946), as well as non-transitory machine readable storage media 1948 having stored therein centralized control plane (CCP) software 1950. The CCP software 1950 includes the VNF manager 1875 discussed herein above.

In embodiments that use compute virtualization, the processor(s) 1942 typically execute software to instantiate a virtualization layer 1954 and software container(s) 1962A-R (e.g., with operating system-level virtualization, the virtualization layer 1954 represents the kernel of an operating system (or a shim executing on a base operating system) that allows for the creation of multiple software containers 1962A-R (representing separate user space instances and also called virtualization engines, virtual private servers, or jails) that may each be used to execute a set of one or more applications; with full virtualization, the virtualization layer 1954 represents a hypervisor (sometimes referred to as a virtual machine monitor (VMM)) or a hypervisor executing on top of a host operating system, and the software containers 1962A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 1950 (illustrated as CCP instance 1976A) is executed within the software container 1962A on the virtualization layer 1954. In embodiments where compute virtualization is not used, the CCP instance 1976A on top of a host operating system is executed on the "bare metal" general purpose control plane device 1904. The instantiation of the CCP instance 1976A, as well as the virtualization layer 1954 and software containers 1962A-R if implemented, are collectively referred to as software instance(s) 1952.

In some embodiments, the CCP instance 1976A includes a network controller instance 1978. The network controller instance 1978 includes a centralized reachability and forwarding information module instance 1979 (which is a middleware layer providing the context of the network controller 1878 to the operating system and communicating with the various NEs), and an CCP application layer 1980 (sometimes referred to as an application layer) over the middleware layer (providing the intelligence required for various network operations such as protocols, network situational awareness, and user-interfaces). A VNF manager instance 1975 is included in the CCP application layer 1980 in one embodiment. At a more abstract level, this CCP application layer 1980 within the centralized control plane 1876 works with virtual network view(s) (logical view(s) of the network) and the middleware layer provides the conversion from the virtual networks to the physical view.

The centralized control plane 1876 transmits relevant messages to the data plane 1880 based on CCP application layer 1980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1880 may receive different messages, and thus different forwarding information. The data plane 1880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1880, the packet (or a subset of the packet header and content) is typically forwarded to the centralized control plane 1876. The centralized control plane 1876 will then program forwarding table entries into the data plane 1880 to accommodate packets belonging to the flow of the unknown packet. Once a specific forwarding table entry has been programmed into the data plane 1880 by the centralized control plane 1876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

The operations of the flow diagrams of FIGS. 6-9 and 17 are described with reference to the exemplary embodiment of FIGS. 10-11, 18A-F, and 9. However, it should be understood that the operations of flow diagrams can be performed by embodiments of the invention other than those discussed with reference to the exemplary embodiment of FIGS. 10-11, 18A-F, and 19, and the exemplary embodiment of FIGS. 10-11, 18A-F, and 19 can perform operations different than those discussed with reference to the flow diagrams of FIGS. 6-9 and 17.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a virtual network function (VNF) manager for delivering of services to a roaming user equipment (UE), the services being offered by a set of VNFs hosted on a source radio base station, and being delivered to the roaming UE via a radio interface of the source radio base station, wherein the roaming UE is to roam from a radio coverage area of the source radio base station into a radio coverage area of a target radio base station, the method comprising:

identifying a trigger condition for handing-over delivery of at least a subset of the services from the radio interface of the source radio base station to a radio interface of the target radio base station;

transferring the subset of the services to the target radio base station through a route from either the source radio base station or the VNF manager to the target radio base station based on information from a software-defined networking (SDN) controller of a SDN system that includes the source radio base station and the target radio base station, wherein the transferring comprises causing the SDN controller to set up the route from the source radio base station to the target radio base station based on a bandwidth required to transfer a clone of the at least one VNF from the source radio base station to the target radio base station; and causing at least one VNF to be deployed on the target radio base station, the at least one VNF on the target radio base station being adapted to offer the subset of the services to the roaming UE.

2. The method of claim 1, wherein the subset of the services is interrupted prior to the subset of the services being offered by the target radio base station and the bandwidth required is based on an acceptable interruption time for the at least the subset of the services.

3. The method of claim 1, wherein the subset of the services is offered continuously by the source radio base station prior to the subset of the services being offered by the target radio base station.

4. The method of claim 1, wherein the transferring the subset of the services to the target radio base station comprises:
 causing the SDN controller to set up the route from the VNF manager to the target radio base station to obtain construction information on the subset of the services to deploy the at least VNF on the target radio base station, and the construction information being retrieved from a database.

5. The method of claim 1, further comprising:
 updating the route based on the information from the SDN controller upon determining that additional services are to be transferred to the target radio base station.

6. The method of claim 1, further comprising:
 updating the route based on a number of VNFs within the set of VNFs remaining on the source radio base station.

7. The method of claim 1, further comprising:
 removing the at least one VNF on the source radio base station upon the at least one VNF being deployed on the target radio base station.

8. The method of claim 1, wherein the SDN controller is implemented in a same electronic device with the VNF manager.

9. A virtual network function (VNF) manager for delivering of services to a roaming user equipment (UE), the services being to be offered by a set of VNFs hosted on a source radio base station, and being to be delivered to the roaming UE via a radio interface of the source radio base station, wherein the roaming UE is to roam from a radio coverage area of the source radio base station into a radio coverage area of a target radio base station, the VNF manager comprising:
 a processor and a non-transitory machine-readable storage medium that coupled to the processor, the non-transitory machine-readable storage medium containing instructions, which when executed by the processor, cause the VNF manager to:
  identify a trigger condition for handing-over delivery of at least a subset of the services from the radio interface of the source radio base station to a radio interface of the target radio base station,
  transfer the subset of the services to the target radio base station through a route from either the source radio base station or the VNF manager to the target radio base station based on information from a software-defined networking (SDN) controller of a SDN system that includes the source radio base station and the target radio base station, wherein the transferring comprises causing the SDN controller to set up the route from the source radio base station to the target radio base station based on a bandwidth required to transfer a clone of the at least one VNF from the source radio base station to the target radio base station, and
  cause at least one VNF to be deployed on the target radio base station, the at least one VNF on the target radio base station being adapted to offer the subset of the services to the roaming UE.

10. The VNF manager of claim 9, wherein the transfer of the subset of the services to the target radio base station is to:
 cause the SDN controller to set up the route from the VNF manager to the target radio base station to obtain construction information on the subset of the services to deploy the at least VNF on the target radio base station, and the construction information being retrieved from a database.

11. The VNF manager of claim 9, where the VNF manager is further to:
 update the route based on the information from the SDN controller upon determining that additional services are to be transferred to the target radio base station.

12. The VNF manager of claim 9, wherein the SDN controller is implemented in a same electronic device with the VNF manager.

13. A non-transitory machine-readable medium having instructions stored therein, which when executed by a processor, cause the processor to perform operations in a virtual network function (VNF) manager for delivering of services to a roaming user equipment (UE), the services being offered by a set of VNFs hosted on a source radio base station, and being delivered to the roaming UE via a radio interface of the source radio base station, wherein the roaming UE is to roam from a radio coverage area of the source radio base station into a radio coverage area of a target radio base station, the operations comprising:
 identifying a trigger condition for handing-over delivery of at least a subset of the services from the radio interface of the source radio base station to a radio interface of the target radio base station;
 transferring the subset of the services to the target radio base station through a route from either the source radio base station or the VNF manager to the target radio base station based on information from a software-defined networking (SDN) controller of a SDN system that includes the source radio base station and the target radio base station, wherein the transferring comprises causing the SDN controller to set up the route from the source radio base station to the target radio base station based on a bandwidth required to transfer a clone of the at least one VNF from the source radio base station to the target radio base station; and
 causing at least one VNF to be deployed on the target radio base station, the at least one VNF on the target radio base station being adapted to offer the subset of the services to the roaming UE.

14. The non-transitory machine-readable medium of claim 13, wherein the subset of the services is interrupted prior to the subset of the services being offered by the target radio base station and the bandwidth required is based on an acceptable interruption time for the at least the subset of the services.

15. The non-transitory machine-readable medium of claim 13, wherein the operations further comprise:
 updating the route based on the information from the SDN controller upon determining that additional services are to be transferred to the target radio base station.

16. The non-transitory machine-readable medium of claim 13, wherein the operations further comprise:
 updating the route based on a number of VNFs within the set of VNFs remaining on the source radio base station.

17. The non-transitory machine-readable medium of claim 13, wherein the operations further comprise:
    removing the at least one VNF on the source radio base station upon the at least one VNF being deployed on the target radio base station.

* * * * *